United States Patent
Han et al.

(10) Patent No.: US 11,709,559 B2
(45) Date of Patent: Jul. 25, 2023

(54) TOUCH DISPLAY DEVICE AND METHOD OF DRIVING THE SAME

(71) Applicant: LG Display Co., Ltd., Seoul (KR)

(72) Inventors: Sung Su Han, Goyang-si (KR); Hwi Deuk Lee, Gumi-si (KR); Yang Sik Lee, Seoul (KR); Jong Sung Kim, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/530,135

(22) Filed: Nov. 18, 2021

(65) Prior Publication Data

US 2022/0187938 A1 Jun. 16, 2022

(30) Foreign Application Priority Data

Dec. 16, 2020 (KR) .......................... 10-2020-0176647

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05); *G06F 3/0446* (2019.05); *G06F 2203/04111* (2013.01)

(58) Field of Classification Search
CPC .... G06F 3/0412; G06F 3/0445; G06F 3/0446; G06F 2203/04111; G06F 2203/04112; G06F 3/04162; G06F 3/0414; G06F 3/04164; G06F 3/042; G06F 3/0441; G06F 3/03545; G06F 3/0383; G06F 3/041
See application file for complete search history.

(56) References Cited

U.S. PATENT DOCUMENTS

| | | | |
|---|---|---|---|
| 10,852,897 B2 | 12/2020 | Lee et al. | |
| 11,106,299 B2 | 8/2021 | Lee et al. | |
| 2016/0062505 A1* | 3/2016 | Hwang | G06F 3/0445 345/174 |
| 2017/0139525 A1* | 5/2017 | Jo | G06F 3/0448 |
| 2019/0102010 A1* | 4/2019 | Knabenshue | G06F 3/0442 |
| 2019/0113993 A1* | 4/2019 | Lee | G06F 3/0446 |
| 2020/0026385 A1 | 1/2020 | Lee et al. | |
| 2020/0167038 A1 | 5/2020 | Lee et al. | |
| 2020/0201480 A1 | 6/2020 | Choi et al. | |
| 2022/0069018 A1* | 3/2022 | Kim | G06F 3/0445 |
| 2022/0107708 A1* | 4/2022 | Jeong | H01L 27/3244 |
| 2022/0147212 A1* | 5/2022 | Kim | G06F 3/0446 |

FOREIGN PATENT DOCUMENTS

| | | | |
|---|---|---|---|
| KR | 10-2020-0009804 A | 1/2020 | |
| KR | 10-2020-0061053 A | 6/2020 | |
| KR | 10-2020-0076941 A | 6/2020 | |

* cited by examiner

*Primary Examiner* — Md Saiful A Siddiqui
(74) *Attorney, Agent, or Firm* — Fenwick & West LLP

(57) ABSTRACT

A touch display device is provided. The touch display device includes a display panel configured to display an image, a touch sensor including a first touch electrode and a second touch electrode arranged to cross each other, and a dummy touch electrode disposed adjacent to the first touch electrode and the second touch electrode, on the display panel, and a touch driver configured to drive the first touch electrode and the second touch electrode and apply a signal or a voltage to the dummy touch electrode.

16 Claims, 22 Drawing Sheets

TOUCH DISPLAY DEVICE AND METHOD OF DRIVING THE SAME

CROSS-REFERENCE TO RELATED APPLICATIONS

This application claims the benefit of Korean Patent Application No. 10-2020-0176647, filed on Dec. 16, 2020, which is hereby incorporated by reference as if fully set forth herein.

BACKGROUND OF THE INVENTION

Field of the Invention

The present invention relates to a touch display device and a method of driving the same.

Discussion of the Related Art

The development of information technology has brought the growth of the market for display devices, which are a connection medium between users and information. Accordingly, display devices such as a light emitting display (LED) device, a quantum dot display (QDD) device, and a liquid crystal display (LCD) device are increasingly used.

Such a display device includes a display panel including sub-pixels, a driver that outputs a driving signal for driving the display panel, and a power supply that generates power to be supplied to the display panel or the driver.

In the display device, upon application of a driving signal, for example, a scan signal and a data signal to sub-pixels on the display panel, the selected sub-pixels transmit light or directly emit light, thereby displaying an image. Further, the display device may receive a touch input from a user based on a touch sensor and execute a command corresponding to the touch input.

SUMMARY OF THE INVENTION

Accordingly, the present invention is directed to a touch display device and a method of driving the same that substantially obviate one or more problems due to limitations and disadvantages of the related art.

The present invention is intended to increase the transmission and reception sensitivity of a signal and decrease noise between an active pen and a device by forming dummy touch electrodes in the vicinity of touch electrodes and applying a specific signal or voltage through the dummy touch electrodes in each driving mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch display device includes a display panel configured to display an image, a touch sensor including a first touch electrode and a second touch electrode arranged to cross each other, and a dummy touch electrode disposed adjacent to the first touch electrode and the second touch electrode, on the display panel, and a touch driver configured to drive the first touch electrode and the second touch electrode and apply a signal or a voltage to the dummy touch electrode.

The touch driver may apply the same signal as an uplink signal applied to the first touch electrode or the second touch electrode to the dummy touch electrode during an uplink signal generation period in which a signal to be transmitted to an active pen placed on the touch sensor is generated.

The touch driver may apply a logic low signal or a low voltage to the dummy touch electrode during a downlink pulse sensing period in which a signal generated from an active pen placed on the touch sensor is sensed.

The touch driver may apply a logic low signal or a low voltage to the dummy touch electrode during an uplink signal generation period in which a signal to be transmitted to an active pen placed on the touch sensor is generated and during a downlink pulse sensing period in which a signal generated from the active pen placed on the touch sensor is sensed.

The touch sensor may further include a ring guard disposed to surround an active area in which the first touch electrode, the second touch electrode, and the dummy touch electrode are located, and the touch driver may apply the signal or the voltage to the ring guard.

The dummy touch electrode may include a first dummy touch electrode configured to execute the same function as the first touch electrode, and a second dummy touch electrode configured to execute the same function as the second touch electrode.

When a first dummy transistor located between the first touch electrode and a first channel of the touch driver is turned on, the first dummy touch electrode may execute the same function as the first touch electrode, and when a second dummy transistor located between the second touch electrode and a second channel of the touch driver is turned on, the second dummy touch electrode may execute the same function as the second touch electrode.

The first dummy transistor and the second dummy transistor may be simultaneously tuned on or tuned off in response to a dummy control signal output from a third channel of the touch driver.

The touch driver may include switches configured to control input and output of the first channel, the second channel, and the third channel, a circuit configured to output or sense a signal, when the circuit is connected to a channel through the switches, and a controller configured to control the switches and the circuit.

The dummy touch electrode may be located between portions of the first touch electrode and between portions of the second touch electrode, on the same layer as the first touch electrode and the second touch electrode.

According to another aspect, a method of driving a touch display device including a display panel configured to display an image, a touch sensor including a first touch electrode and a second touch electrode arranged to cross each other, and a dummy touch electrode disposed adjacent to the first touch electrode and the second touch electrode, on the display panel, and a touch driver configured to drive the first touch electrode and the second touch electrode and apply a signal or a voltage to the dummy touch electrode includes generating an uplink signal to be transmitted to an active pen placed on the touch sensor, and sensing a downlink pulse generated from the active pen placed on the touch sensor. The same signal as an uplink signal applied to the first touch electrode or the second touch electrode is applied to the dummy touch electrode during the uplink signal generation.

A logic low signal or a low voltage may be applied to the dummy touch electrode during the downlink pulse sensing.

In still another embodiment, a touch display device comprises a display panel configured to display an image; and a touch sensor on the display panel, the touch sensor including a first touch electrode, a second touch electrode arranged to cross the first touch electrode, and a dummy touch electrode disposed around the first touch electrode and the second touch electrode, wherein the dummy touch electrode is electrically connected to the first touch electrode or the second touch electrode in response to a dummy control signal being in a first state, and wherein the dummy touch electrode is electrically disconnected from the first touch electrode and the second touch electrode in response to the dummy control signal being in a second state.

In some embodiments, during an uplink signal generation period in which a signal to be transmitted to an active pen placed on the touch sensor is generated, the dummy touch electrode is electrically connected to the first touch electrode or the second touch electrode in response to the dummy control signal being in the first state, and a same signal as an uplink signal applied to the first touch electrode or the second touch electrode is applied to the dummy touch electrode.

In some embodiments, a logic low signal or a low voltage is applied to the dummy touch electrode during a downlink pulse sensing period in which a pen signal generated from an active pen placed on the touch sensor is sensed.

In some embodiments, both during an uplink signal generation period in which a signal to be transmitted to an active pen placed on the touch sensor is generated and during a downlink pulse sensing period in which a pen signal generated from the active pen placed on the touch sensor is sensed: the dummy touch electrode is electrically disconnected from the first touch electrode and the second touch electrode in response to the dummy control signal being in a second state, and a logic low signal or a low voltage is applied to the dummy touch electrode.

In some embodiments, the touch sensor further comprises a ring guard disposed to surround an active area in which the first touch electrode, the second touch electrode, and the dummy touch electrode are located, and wherein a signal or a voltage is applied to the ring guard.

In some embodiments, the dummy touch electrode comprises a first dummy touch electrode configured to be electrically connected to or disconnected from the first touch electrode in response to the dummy control signal; and a second dummy touch electrode configured to be electrically connected to or disconnected from the second touch electrode in response to the dummy control signal. The first dummy electrode and the second dummy electrode are electrically disconnected from each other.

In some embodiments, the touch display device may further comprise a first dummy transistor electrically connecting the first dummy electrode to, or disconnecting the first dummy electrode from, the first touch electrode in response to the dummy control signal, and a second dummy transistor electrically connecting the second dummy electrode to, or disconnecting the second dummy electrode from, the second touch electrode in response to the dummy control signal. The first dummy transistor and the second dummy transistor may be simultaneously turned on or off in response to the dummy control signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

A touch display device according to the present invention may receive a touch input from a user based on a touch sensor and execute a command corresponding to the touch input. The touch display device may be, but not limited to, any of a TV, a video player, a personal computer (PC), a home theater, an automotive electrical device, a smartphone, and so on.

The touch display device according to the present invention may be configured as a light emitting diode (LED) display device, a quantum dot display (QDD) device, or a liquid crystal display (LCD) device. For convenience of description, a light emitting display device that directly emits light based on inorganic LEDs or organic LEDs is taken as an example of the touch display device.

Figure 1:
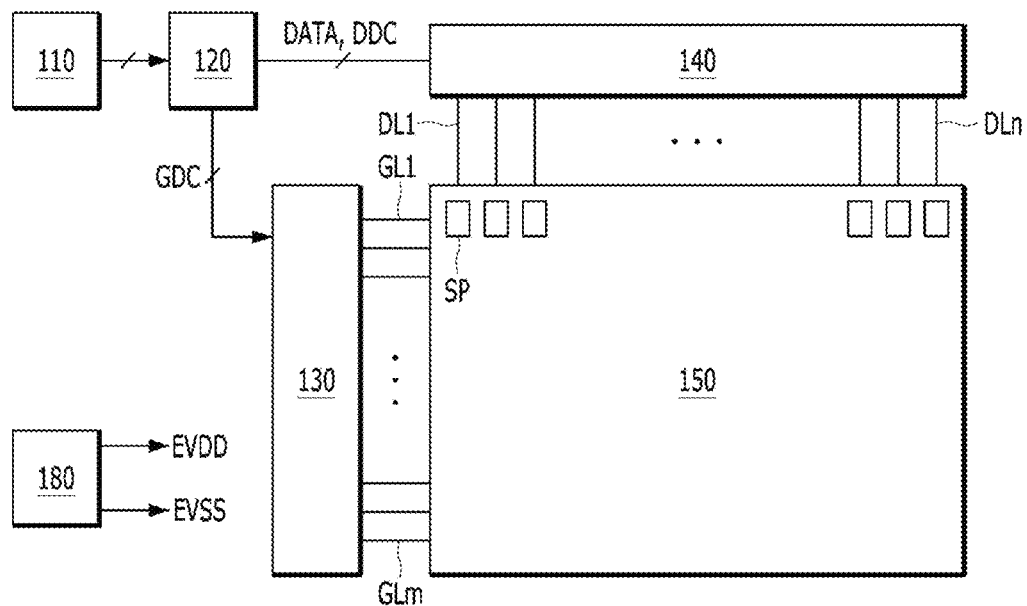
FIG. 1 is a block diagram illustrating a light emitting display device according to the present invention.
Figure 2:
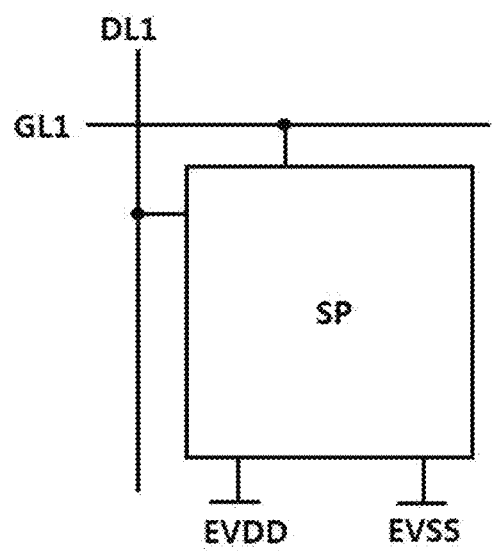
FIG. 2 is a diagram illustrating the configuration of a sub-pixel illustrated in FIG. 1.

FIG. 1 is a block diagram illustrating a light emitting display device, and FIG. 2 is a diagram illustrating the configuration of a sub-pixel illustrated in FIG. 1.

Referring to FIGS. 1 and 2, the light emitting display device may include an image supply 110, a timing controller 120, a scan driver 130, a data driver 140, a display panel 150, and a power supply 180.

The image supply 110 (or host system) may output various driving signals together with an image data signal received from the outside or an image data signal stored in an internal memory. The image supply 110 may transmit the data signal and the various driving signals to the timing controller 120.

The timing controller 120 may output a gate timing control signal GDC for controlling the operation timing of the scan driver 130, a data timing control signal DDC for controlling the operation timing of the data driver 140, and various synchronization signals (a vertical synchronization signal Vsync and a horizontal synchronization signal Hsync). The timing controller 120 may transmit a data signal DATA received from the image supply 110 together with the data timing control signal DDC to the data driver 140. The timing controller 120 may be configured in the form of an integrated circuit (IC) and mounted on a printed circuit board (PCB), which should not be construed as limiting the present invention.

The scan driver 130 may output a scan signal (or a scan voltage) in response to the gate timing control signal GDC received from the timing controller 120. The scan driver 130 may transmit the scan signal to sub-pixels included in the display panel 150 through scan lines GL1 to GLm. The scan driver 130 may be configured in the form of an IC or may be formed directly on the display panel 150 in a gate-in-panel (GIP) manner, which should not be construed as limiting the present invention.

The data driver 140 may sample and latch the data signal DATA in response to the data timing control signal DDC received from the timing controller 120, and convert a digital data signal to an analog data voltage based on a gamma reference voltage. The data driver 140 may supply the data voltage to the sub-pixels included in the display panel 150 through data lines DL1 to DLn. The data driver 140 may be configured in the form of an IC and mounted on the display panel 150 or may be mounted on the PCB, which should not be construed as limiting the present invention.

The power supply 180 may generate high-potential first power and low-potential second power based on an external input voltage received from the outside and output the high-potential first power and the low-potential second power through a first power line EVDD and a second power line EVSS. The power supply 180 may generate and output a voltage (e.g., a gate voltage including a gate high voltage and a gate low voltage) required for driving the scan driver 130 or a voltage (e.g., a drain voltage including a drain voltage and a half drain voltage) required for driving the data driver 140.

The display panel 150 may display an image in response to a driving signal including the scan signal and the data voltage, the first power, and the second power. The sub-pixels of the display panel 150 directly emit light. The display panel 150 may be manufactured based on a rigid or flexible substrate formed of a material such as glass, silicon, or polyimide. In addition, the sub-pixels that emit light may be red, green, and blue (RGB) sub-pixels or red, green, blue, and white (RGBW) sub-pixels, which form pixels.

For example, one sub-pixel SP may be connected to the first gate line GL1, the first data line DL1, the first power line EVDD, and the second power line EVSS. The sub-pixel SP may include a pixel circuit with a switching transistor, a driving transistor, a capacitor, and an organic light emitting diode. The sub-pixels SP used in the light emitting display device, which directly emit light, have a complex circuit configuration. Furthermore, there are various compensation circuits for compensating for deterioration of not only the organic light emitting diode that emits light but also the driving transistor that applies a driving current to the organic light emitting diode. In this context, a sub-pixel SP is illustrated as simplified in the form of a block.

The timing controller 120, the scan driver 130, and the data driver 140 have been described above as separate components. However, one or more of the timing controller 120, the scan driver 130, and the data driver 140 may be integrated into one IC depending on implementation of the light emitting display device.

FIGS. 3 to 6 are block diagrams illustrating a touch display device.

Figure 3:
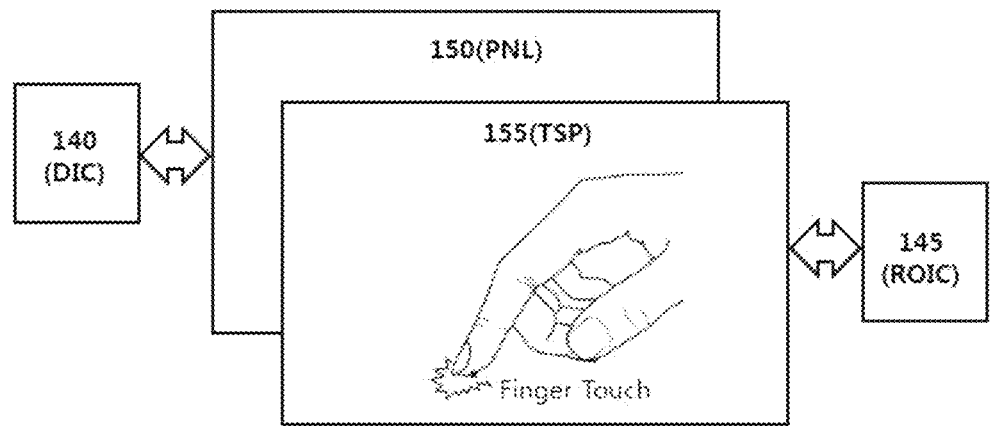
FIGS. 3 to 6 are block diagrams illustrating a touch display device.
Figure 4:
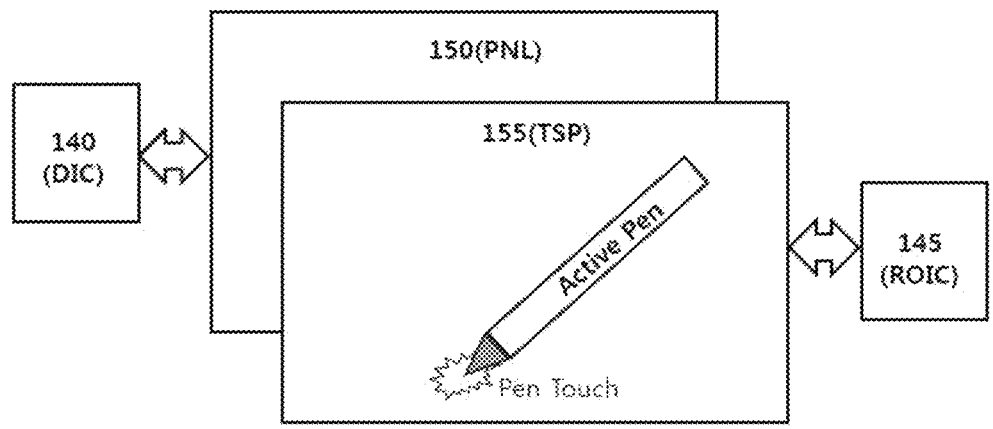

Referring to FIGS. 3 and 4, the touch display device may include a display panel 150 (or PNL), a touch sensor 155 (or TSP), a data driver 140 (or DIC), and a touch driver 145 (or ROIC) (a read-out circuit or a sensing circuit).

The touch sensor 155, which is an input device capable of receiving a touch input from a user, may be disposed together with the display panel 150 that displays an image. The touch sensor 155 may have a touch electrode. The touch sensor 155 may be implemented as a separate touch sensor, implemented together with a part of the display panel 150, or implemented inside (integrated with) the display panel 150, depending on how the touch electrode and its peripheral structure are manufactured.

The touch driver 145 may detect the presence or absence of a touch on the display panel 150 and information about the position of the input based on a process of applying a touch driving voltage through the touch electrode included in the touch sensor 155 and performing sensing. The touch driver 145 may operate in conjunction with the touch sensor 155 and sense a finger touch or a pen touch of the user.

Figure 5:
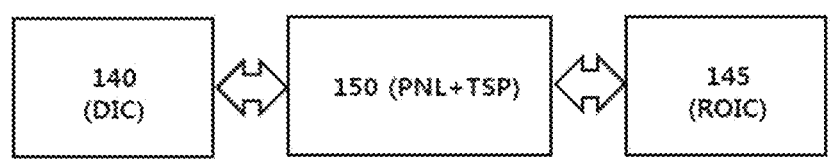
Figure 6:

Referring to FIGS. 5 and 6, the touch driver 145 may be implemented in various manners according to how the touch panel 150 and the touch sensor 155 are implemented. For example, the touch driver 145 may be configured in the form of an integrated circuit (IC) separated from the data driver 140 or may be incorporated into the data driver 140

Figure 7:
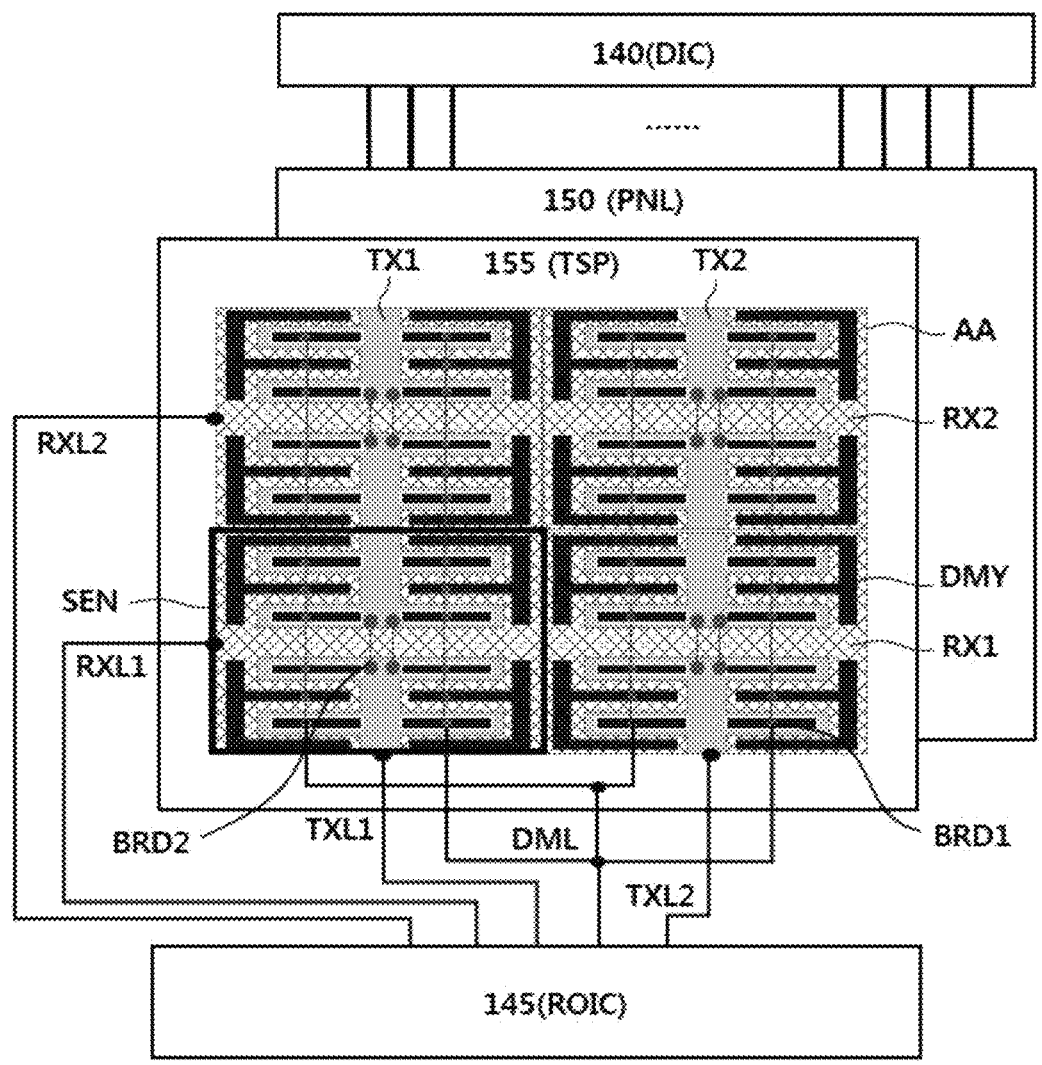
FIG. 7 is a block diagram illustrating a touch display device according to a first embodiment of the present invention.
Figure 8:
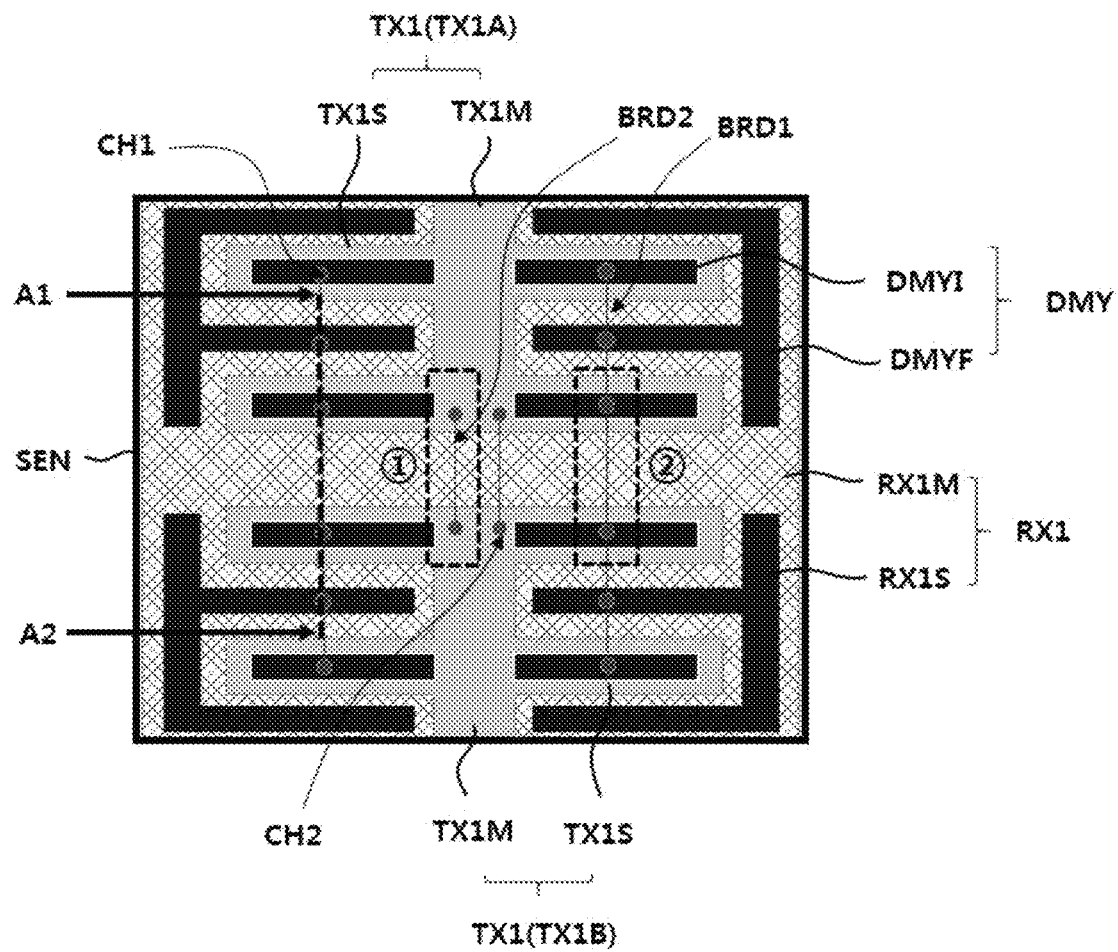
FIG. 8 is a detailed diagram illustrating one sensor unit illustrated in FIG. 7.
Figure 9:
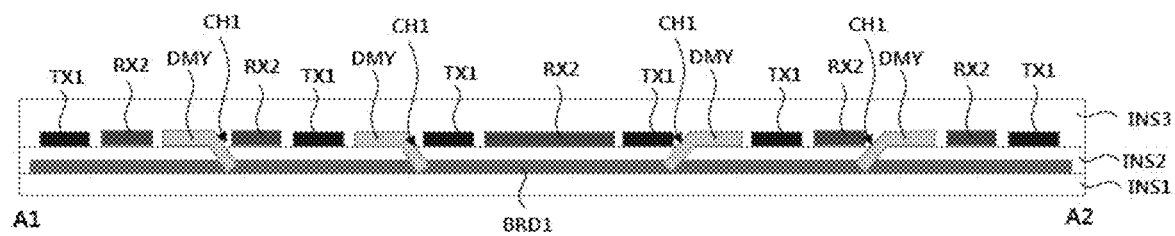
FIG. 9 is a diagram illustrating a cross-section of the sensor unit illustrated in FIG. 8, taken along line A1-A2.

FIG. 7 is a block diagram illustrating a touch display device according to a first embodiment of the present invention, FIG. 8 is a detailed diagram illustrating one sensor unit illustrated in FIG. 7, and FIG. 9 is a diagram illustrating a cross-section of the sensor unit illustrated in FIG. 8, taken along line A1-A2.

Referring to FIG. 7, the touch sensor 155 may include first touch electrodes TX1 and TX2, second touch electrodes RX1 and RX2, and dummy touch electrodes DMY, which are arranged in an active area AA.

The first touch electrodes TX1 and TX2 may be connected to the touch driver 145 through first touch lines TXL1 and TXL2. The second touch electrodes RX1 and RX2 may be connected to the touch driver 145 through second touch lines RXL1 and RXL2. The dummy touch electrodes DMY may be connected to the touch driver 145 through a dummy touch line DML. The first touch electrodes TX1 and TX2 and the second touch electrodes RX1 and RX2 may be arranged on the same layer, crossing each other. The dummy touch electrodes DMY may be arranged in the vicinity of the first touch electrodes TX1 and TX2 and the second touch electrodes RX1 and RX2 on the same layer, particularly among branches of the first touch electrodes TX1 and TX2 and among branches of the second touch electrodes RX1 and RX2.

The first touch electrodes TX1 and TX2 and/or the second touch electrodes RX1 and RX2 may be mesh-type touch electrodes. Each of the openings in a mesh-type touch electrode may correspond to a light emitting area of a sub-pixel. The dummy electrodes DMY may be shaped by partially disconnecting some connections inside the mesh-type touch electrodes. However, the shapes and arrangement of the touch electrodes TX1, TX2, RX1, and RX2 and the dummy touch electrodes DMY according to the present invention are not limited thereto.

Referring to FIGS. 7, 8 and 9, the first touch electrodes TX1 and TX2, the second touch electrodes RX1 and RX2, and the dummy touch electrodes DMY may be interposed between a second insulating layer INS2 and a third insulating layer INS3. The first touch electrodes TX1 and TX2, the second touch electrodes RX1 and RX2, and the dummy touch electrodes DMY may be spaced from each other (electrically isolated) in the active area AA. In addition, the first touch electrodes TX1 and TX2 and the dummy touch electrodes DMY except for the second touch electrodes RX1 and RX2 may be arranged apart from each other even in a sensor unit SEN forming one sensing area.

The structures of the first touch electrodes TX1 and TX2, the second touch electrodes RX1 and RX2, and the dummy touch electrodes DMY will be described below, focusing on some of the touch electrodes TX1, TX2, RX1, RX2, and DMY arranged in the sensor unit SEN.

The second touch electrode RX1 may include a main electrode portion RX1M extending along a first direction (horizontal direction) and a plurality of sub-electrode portions RX1S into which the main electrode portion RX1M are branched at both ends thereof. Accordingly, the second touch electrode RX1 may extend along the first direction (horizontal direction) and have a plurality of branches without any disconnection in the sensor unit SEN.

The first touch electrode TX1 may extend along a second direction (vertical direction), including one electrode portion TX1A disposed on one side (upper side in FIG. 8) of the main electrode portion RX1M of the second touch electrode RX1 and the other electrode portion TX1B disposed on the other side (lower side in FIG. 8) of the main electrode portion RX1M of the second touch electrode RX1 in the sensor unit SEN. Each of the one electrode portion TX1A and the other electrode portion TX1B of the first touch electrode TX1 may include a main electrode portion TX1M extending along the second direction (vertical direction) and an extension electrode portion TX1S extending along the first direction (horizontal direction) from the main electrode portion TX1M. Accordingly, the first touch electrode TX1 may extend along the second direction (vertical direction), split into segments extending in the first direction (horizontal direction) in the sensor unit SEN.

A dummy touch electrode DMY may be disposed separately, with separated portions arranged among branched portions of the second touch electrode RX1 and among branched portions of the first touch electrode TX1. The dummy touch electrode DMY may include F-shaped portions DMYF and I-shaped portions DMYI. The F-shaped portions DMYF of the dummy touch electrode DMY may be arranged in the vicinity of the corners of the second touch electrode RX1. In addition, the I-shaped portions DMYI of the dummy touch electrode DMY may be arranged along the first direction (horizontal direction) among the F-shaped portions DMYF. In relation to the other electrodes, each of the I-shaped portions DMYI of the dummy touch electrode DMY may be disposed between extension electrode portions TX1S of the first touch electrode TX1. Accordingly, the dummy touch electrode DMY may have a plurality of segments among the branches of the second touch electrode RX1 and the branches of the first touch electrode TX1 in the sensor unit SEN.

Although the dummy touch electrode DMY has a plurality of segments arranged among the branches of the second touch electrode RX1 and the branches of the first touch electrode TX1, the segments may be electrically connected to each other by a first connection electrode BRD1 located between a first insulating layer INS1 and the second insulating layer INS2. That is, the separately arranged segments of the dummy touch electrode DMY may be electrically connected to each other by contacting the first connection electrode BRD1 exposed through a first contact hole CH1.

Each of the first touch electrodes TX1 and TX2 may also be located between the first insulating layer INS1 and the second insulating layer INS2, and its separated portions may be electrically connected by contacting a second connection electrode BRD2 exposed through a second contact hole CH2. Although the second connection electrode BRD2 is positioned on the first insulating layer INS1 like the first connection electrode BRD1, the second connection electrode BRD2 is electrically isolated (disposed separately) from the first connection electrode BRD1.

The structure of the dummy touch electrode according to the present invention is illustrated and described only for better understanding, and thus the present invention is not limited to the structure described with reference to FIGS. 8 and 9. When the above-described touch sensor 155 is formed in a series of processes involved in manufacturing the display panel 150, the overall structure of the touch sensor 155 and the display panel 150 and specific parts thereof will be illustrated and described as follows.

Figure 10:
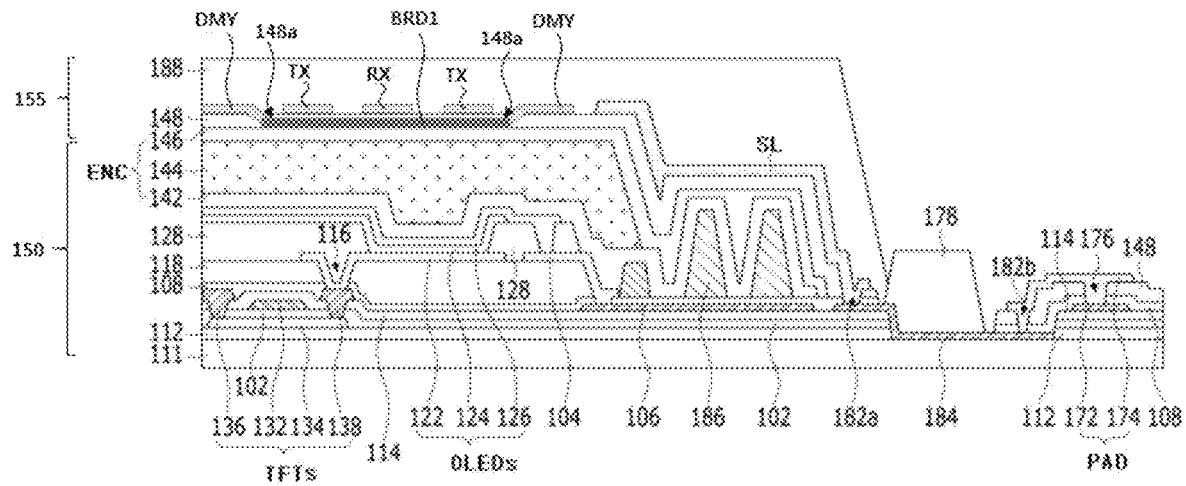
FIGS. 10 and 11 are exemplary diagrams illustrating a connection structure for a first touch electrode and a connection structure for a dummy touch electrode along with an overall structure of a display panel and a touch sensor.
Figure 11:
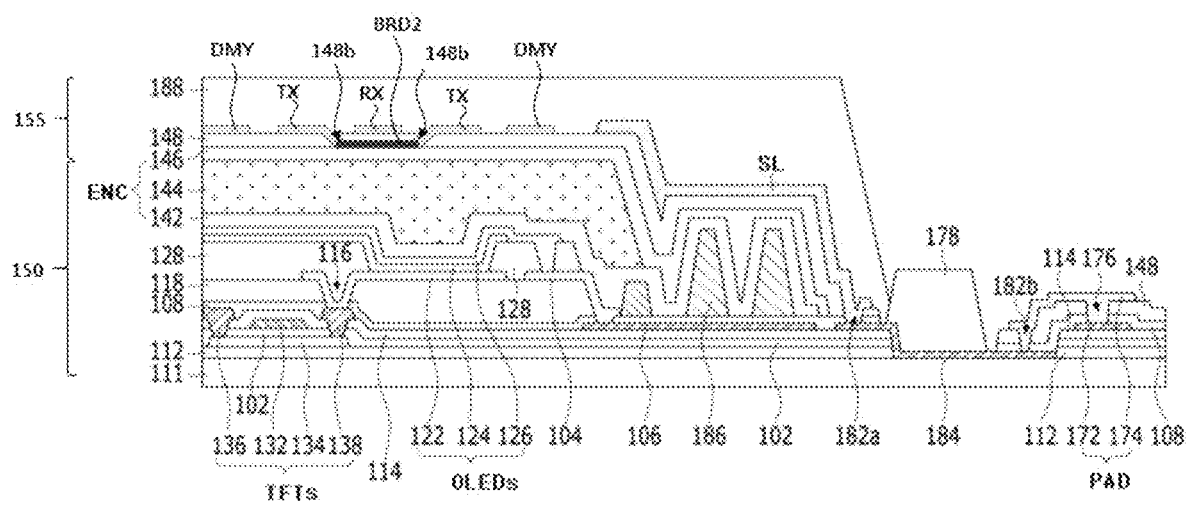

FIGS. 10 and 11 are exemplary diagrams illustrating a connection structure for a first touch electrode and a connection structure for a dummy touch electrode along with an overall structure of a display panel and a touch sensor.

Referring to FIGS. 10 and 11, the display panel 150 may include a transistor layer TFTs that forms thin-film transistors and a light emitting diode layer OLEDs that forms organic light emitting diodes. The touch sensor 155 may include a first touch electrode TX, a second touch electrode RX, and a dummy touch electrode DMY.

The touch sensor 155 may be implemented as an in-cell or on-cell type formed in a series of processes for manufacturing the display panel 150 as well as an add-on type separately attached onto the display panel 150. The connection structure between a first touch electrode part and a dummy touch electrode part will be described in the context of the on-cell type.

A multi-buffer layer 112 may be disposed on a substrate 111. The transistor layer TFTs may be disposed on the multi-buffer layer 112. The transistor layer TFTs may include a semiconductor layer 134, a gate insulating layer 102, a gate electrode 132, an interlayer insulating layer 114, and source and drain electrodes 136 and 138 contacting the semiconductor layer 134, which are stacked on the multi-buffer layer 112. The illustrated transistor layer TFTs are driving transistors that supply a driving current to the organic light emitting diodes. A protection layer 108, a planarization layer 118, and a bank 128 may be stacked on the transistor layer TFTs.

The light emitting diode layer OLEDs may be disposed on the bank 128. The light emitting diode layer OLEDs may include a lower electrode 122 electrically connected to the drain electrode 138 of the transistor layer TFTs through a contact hole 116, a light emitting layer 124, and an upper electrode 126. The upper electrode 126 may be connected to a second power line that transmits second power through a jumping electrode 104 on the planarization layer 118 and an interlayer electrode 106 on the interlayer insulating layer 114. The lower electrode 122 may be selected as an anode electrode, and the upper electrode 126 may be selected as a cathode electrode, which should not be construed as limiting the present invention. The light emitting layer 124 may emit, but not limited to, red, green, blue, or white light.

The transistor layer TFTs and the light emitting diode layer OLEDs may be protected by an encapsulation layer ENC. The encapsulation layer ENC may include a first inorganic layer 142, an organic layer 144, and a second inorganic layer 146. The second inorganic layer 146 may cover up to an area including a first partition wall 186 positioned at an edge of the substrate 111. However, the encapsulation layer ENC may be formed as a single layer, and may vary depending on the shapes of the structures on the substrate 111, which should not be construed as limiting the present invention.

The first touch electrode TX, the second touch electrode RX, the dummy touch electrode DMY, and a touch connection line SL may be disposed between a touch buffer layer 148 and a touch protection layer 188 on the encapsulation layer ENC. The touch connection line SL may serve to electrically connect at least one of the first touch electrode TX, the second touch electrode RX, or the dummy touch electrode DMY to a touch pad PAD. The touch protection layer 188 may partially cover a second partitioning wall 178 (crack preventing wall) positioned outside the first partitioning wall 186, which should not be construed as limiting the present invention.

The touch pad PAD may be positioned outside the second partitioning wall 178 or at an edge of the substrate 111. The touch pad PAD may include a lower touch electrode 172 and an upper touch electrode 174 stacked on the multi-buffer layer 112. The lower touch electrode 172 may be formed of the same material as the drain electrode 138 and positioned on the interlayer insulating layer 114. The upper touch electrode 174 may be formed of the same material as the touch electrode TE and positioned on the touch buffer layer 148. The upper touch electrode 174 may be electrically connected to the lower touch electrode 172 exposed through a touch pad contact hole 176 penetrating the protection layer 108 and the touch buffer layer 148. In addition, the touch pad PAD may be electrically connected to the touch connection line SL through a touch connection electrode 184 positioned between the substrate 111 and the second partitioning wall 178. The touch connection electrode 184 may be connected to the touch connection line SL through a first-side contact hole 182*a* and to the upper touch electrode 174 through a second-side contact hole 182*b*.

FIG. 10 is an exemplary diagram illustrating segments of a dummy touch electrode denoted by ②in FIG. 8, and FIG. 11 is an exemplary diagram illustrating segments of a first touch electrode denoted by ① in FIG. 8. As noted from FIGS. 10 and 11, the dummy touch electrode DMY may be electrically connected to the first connection electrode BRD1 exposed through a first contact hole 148*a* penetrating the touch buffer layer 148. The first touch electrode TX may be electrically connected to the second connection electrode BRD2 exposed through a second contact hole 148*b* penetrating the touch buffer layer 148.

The touch sensor 155 may be formed in the form of a thin film or implemented in the form of a panel together with the display panel 150. In this case, the touch sensor 155 may have a size of about 1:1 corresponding to the size of the display panel 150. In addition, even when the touch sensor 155 grows in size to correspond to the size of the display panel 150, an input may be received through an active pen. Therefore, a method of increasing the transmission and reception sensitivity of a signal is required.

Figure 12:
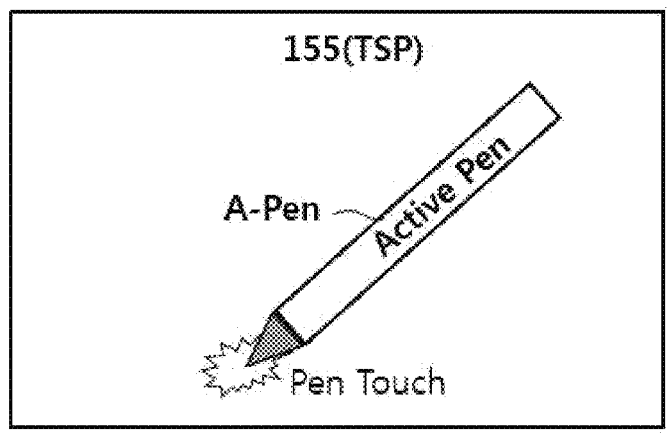
FIGS. 12 and 13 are diagrams illustrating a method of sensing an active pen.
Figure 13:
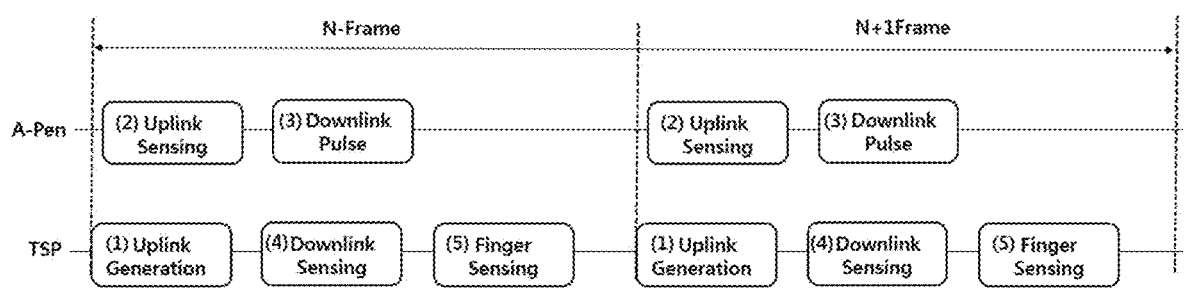
Figure 14:
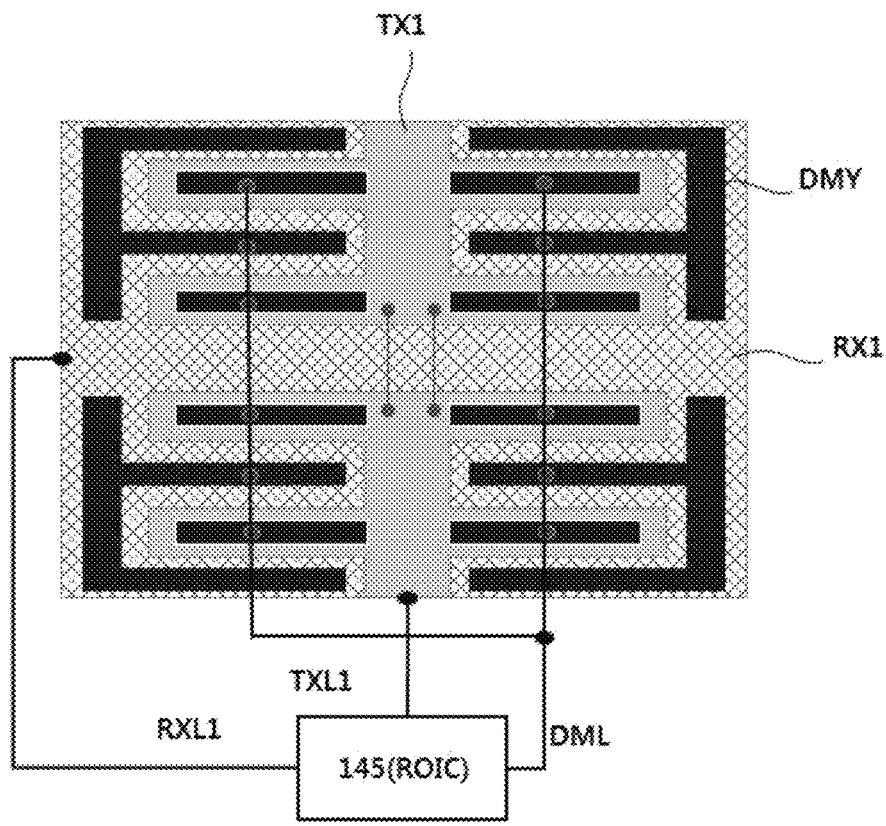
FIGS. 14 and 15 are diagrams illustrating a touch display device and a method of driving the same according to the first embodiment of the present invention.
Figure 15:
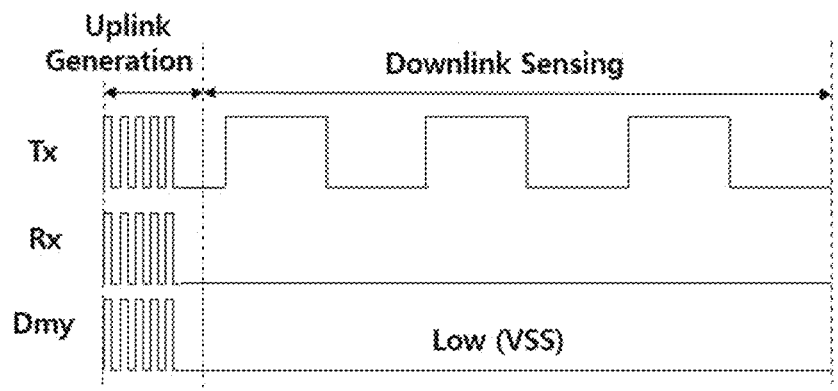
Figure 16:
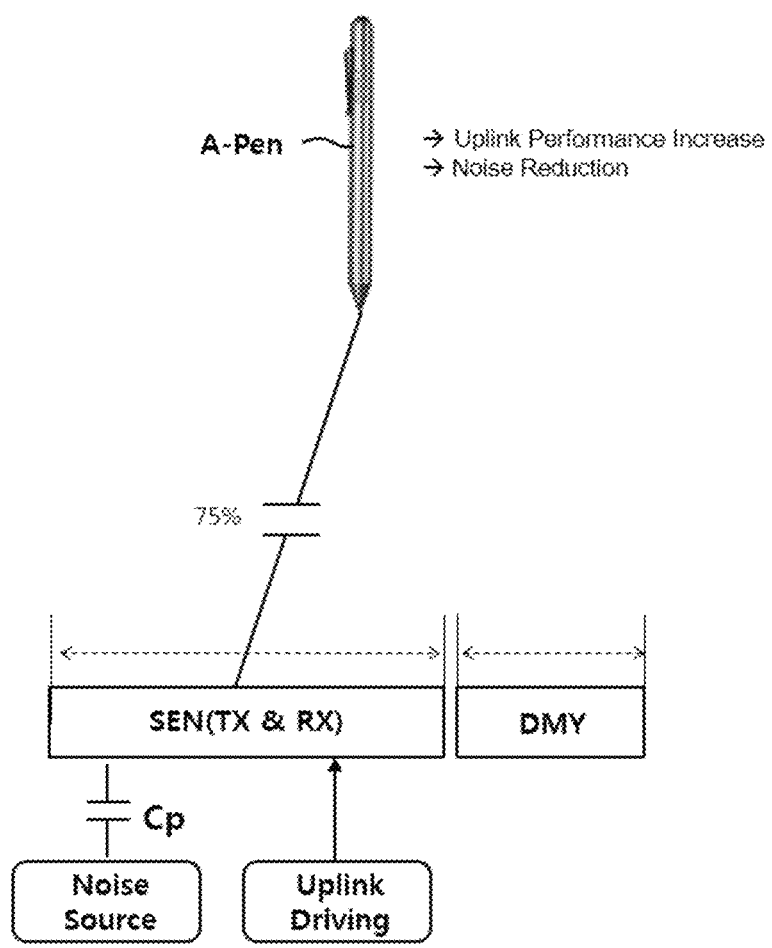
FIGS. 16 and 17 are diagrams referred to for describing effects according to the first embodiment of the present invention.
Figure 17:
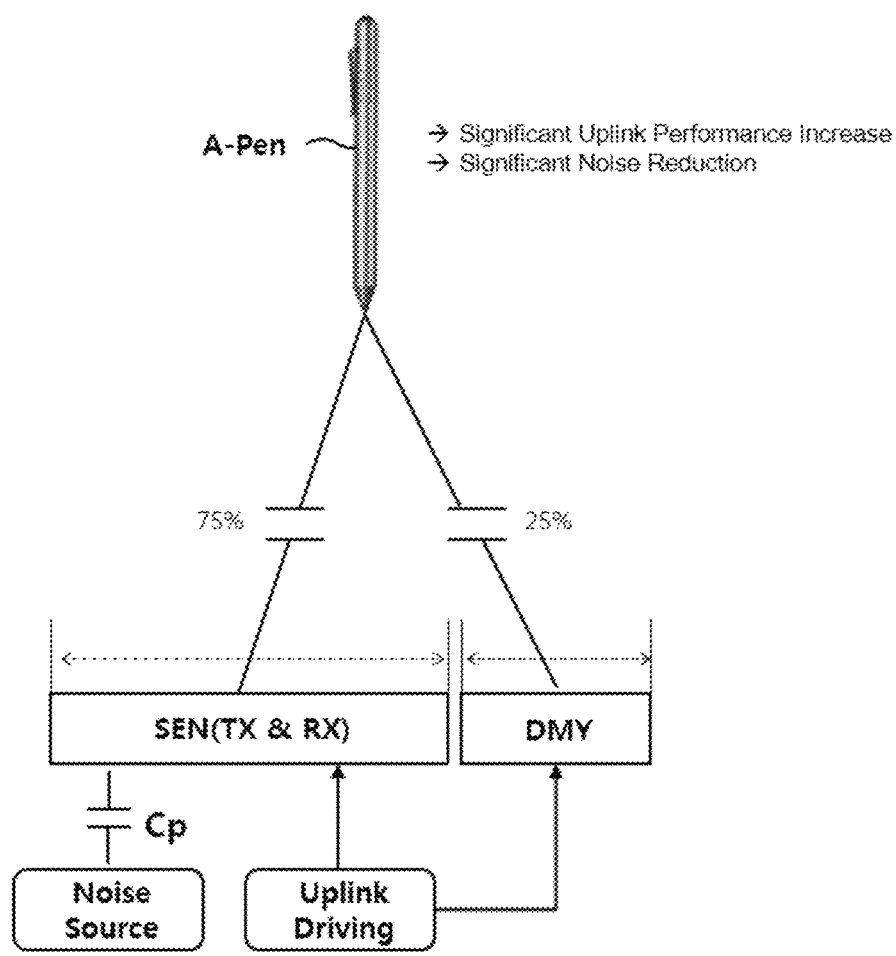

FIGS. 12 and 13 are diagrams illustrating a method of sensing an active pen, FIGS. 14 and 15 are diagrams illustrating a touch display device and a method of driving the same according to the first embodiment of the present invention, and FIGS. 16 and 17 are diagrams for describing effects according to the first embodiment of the present invention.

Referring to FIGS. 12 and 13, the touch display device may sense the presence or absence of a touch, Pen Touch made by an active pen A-Pen placed on the touch sensor 155. Further, the touch display device may sense a pressure applied onto the touch sensor 155 by the active pen A-Pen or a hovering state in which the active pen A-Pen hovers over the touch sensor 155 by a predetermined distance.

The touch display device may transmit and receive signals between the touch sensor 155 and the active pen A-Pen to sense various types of inputs made by the active pen A-Pen. An example of the signal transmission and reception is given as follows.

First, the touch sensor 155 (or the sensing circuit SEN) may generate an uplink signal to be transmitted to the active pen A-Pen, as denoted by "(1) Uplink Generation". Then, the active pen A-Pen may sense the uplink signal generated from the touch sensor 155, as denoted by "(2) Uplink Sensing". The active pen A-Pen may generate a downlink pulse to be transmitted to the touch sensor 155, as denoted by "(3) Downlink Pulse". The touch sensor 155 may sense the downlink pulse generated from the active pen A-Pen, as denoted by "(4) Downlink Sensing".

After signals are exchanged between the touch sensor 155 and the active pen A-Pen in the above flow, a process of sensing the presence or absence of a finger touch may be performed as denoted by "(5) Finger Sensing", which should not be construed as limiting the present invention.

"(1) Uplink Generation" to "(5) Finger Sensing" may be performed during the duration of one frame (e.g., N-Frame). During the duration of the next frame (e.g., N+1 Frame), the process of sensing the presence or absence of a touch made by the active pen A-Pen and a finger may be performed in the same flow.

Referring to FIGS. 14 and 15, the touch driver 145 may operate separately during an uplink signal generation period (Uplink Generation) and during a downlink pulse sensing period (Downlink Sensing) to be synchronized with and sense the active pen.

During the uplink signal generation period Uplink Sensing, the touch driver 145 may generate uplink signals Tx, Rx, and Dmy to be transmitted to the active pen A-Pen through a first touch line TXL1, a second touch line RXL1, and the dummy touch line DML. The uplink signals Tx, Rx, and Dmy may be transmitted to the first touch electrode TX1, the second touch electrode RX1, and the dummy touch electrode DMY through the first touch line TXL1, the second touch line RXL1, and the dummy touch line DML, respectively. The active pen may obtain at least one of the uplink signals Tx, Rx, and Dmy transmitted through the touch electrodes TX1, RX1, and DMY. The uplink signal Rx output through the second touch line RXL1 may be omitted from among the uplink signals Tx, Rx, and Dmy.

The touch driver 145 may generate a downlink signal Tx for sensing a downlink pulse from the active pen through the first touch line TXL1 during the downlink pulse sensing period Downlink Sensing. The downlink signal Tx may be transmitted to the first touch electrode TX1 through the first touch line TXL1.

The active pen may transmit and receive position information and transmit at least one of the strength, position, pressure, or tilt of the active pen, based on the downlink signal Tx transmitted through the first touch line TXL1. During the downlink pulse generation period Downlink Sensing, the touch driver 145 may output a logic low signal Low or a low voltage VSS (or ground voltage) through the dummy touch line DML without generating (outputting) a signal to be transmitted through the second touch line RXL1.

Referring to FIG. 16, the sensor unit SEN including the first touch electrode TX and the second touch electrode RX may not be free from a parasitic capacitor component (parasitic capacitance/parasitic component) because other electrodes or lines are located in the vicinity. Therefore, arrangement of the dummy electrode DMY in an area adjacent to the sensor unit SEN or inside the sensor unit SEN may lead to increased uplink performance and reduced noise.

Referring to FIG. 17, when the dummy electrode DMY is disposed in an area adjacent to the sensor unit SEN or inside the sensor unit SEN and used for uplink driving, the uplink performance may be significantly improved and noise may also be significantly reduced.

The significant increase of the uplink performance may be attributed to increasing required uplink power by transmitting an uplink signal to the dummy electrode DMY during the uplink signal generation period Uplink Generation. Further, the significant noise reduction may be attributed to decreasing the possibility of occurrence of the parasitic capacitor component Cp and increasing a noise shielding capability by transmitting the logic low signal Low or the low voltage VSS (or ground voltage) to the dummy electrode DMY during the downlink pulse sensing period Downlink Sensing.

Figure 18:
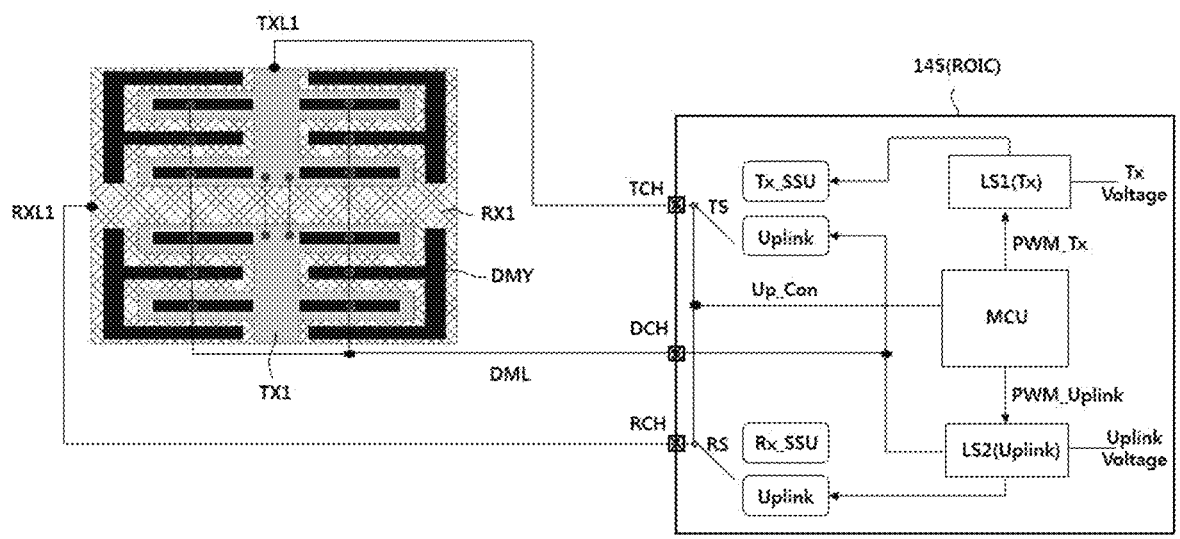
FIG. 18 is an exemplary internal circuit diagram illustrating a touch driver according to the first embodiment of the present invention.
Figure 19:
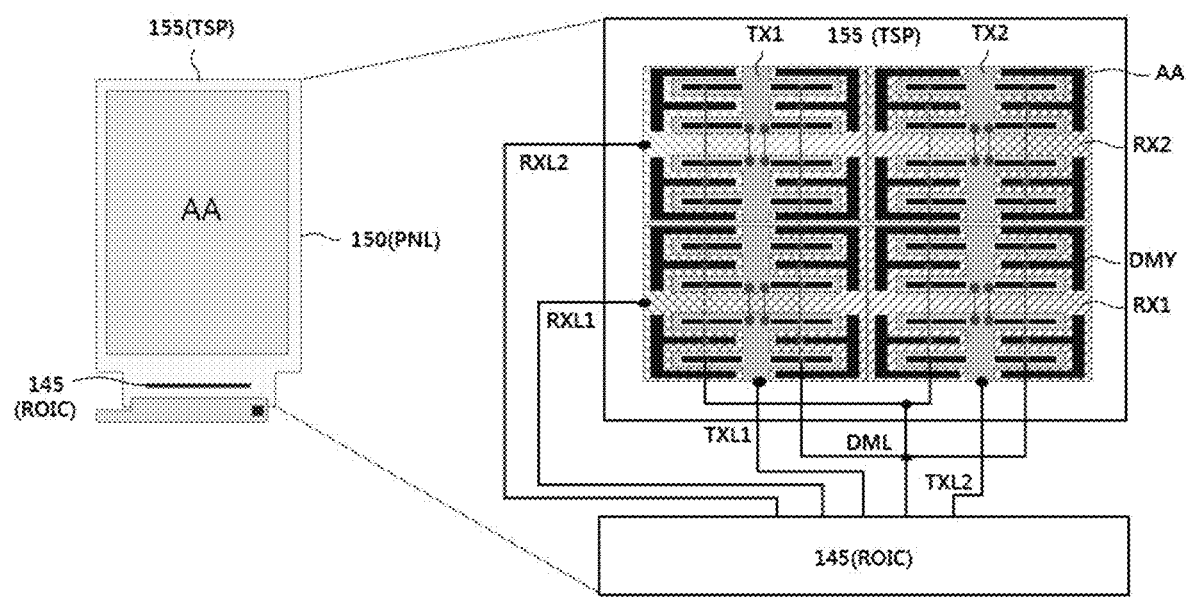
FIG. 19 is an exemplary diagram illustrating a module configuration according to the first embodiment of the present invention.

FIG. 18 is an exemplary internal circuit diagram illustrating a touch driver according to the first embodiment of the present invention, and FIG. 19 is an exemplary diagram illustrating a module configuration according to the first embodiment of the present invention.

Referring to FIG. 18, the touch driver 145 may include a controller MCU, a first level shifter LS1(Tx), a second level shifter LS2(Uplink), a first switch TS, a first circuit Tx_SSU, an uplink unit Uplink, a second switch RS, and a second circuit Rx_SSU.

The controller MCU may control the first level shifter LS1(Tx), the second level shifter LS2(Uplink), the first switch TS, and the second switch RS. The controller MCU may control the first level shifter LS1(Tx) based on a first control signal PWM_Tx, the second level shifter LS2(Uplink) based on a second control signal PWM_Uplink, and the first switch TS and the second switch RS based on a third control signal Up_Con.

The first level shifter LS1(Tx) may operate based on the first control signal PWM_Tx. The first level shifter LS1(Tx) may generate and output a voltage or signal to be provided to the first circuit Tx_SSU based on a first voltage Tx Voltage.

The second level shifter LS2(Uplink) may operate based on the second control signal PWM_Uplink. The second level shifter LS2(Uplink) may generate and output a voltage or signal to be provided to the uplink unit Uplink based on a second voltage Uplink Voltage. In addition, the second level shifter LS2(Uplink) may output an uplink signal through a third channel DCH of the touch driver 145 or output a logic low signal Low or a low voltage VSS (or ground voltage).

The first circuit Tx_SSU may output or sense a first touch signal through a first channel TCH of the touch driver 145. The second circuit Rx_SSU may output or sense a second touch signal through a second channel RCH of the touch driver 145. The uplink unit Uplink may output an uplink signal through the first channel TCH of the touch driver 145 or the second channel RCH of the touch driver 145.

The first switch TS may electrically connect the first channel TCH to the first circuit Tx_SSU or the uplink unit Uplink based on the third control signal Up_Con. The second switch RS may electrically connect the second channel RCH to the second circuit Rx_SSU or the uplink unit Uplink based on the third control signal Up_Con. That is, the first switch TS and the second switch RS may serve to control input/output of a signal through the channels.

The touch driver 145 may include the first channel TCH connected to the first touch line TXL1, the second channel RCH connected to the second touch line RXL1, and the third channel DCH connected to the dummy touch line DMY. The touch driver 145 may selectively output a signal required for a touch in response to the operations of the first switch TS and the second switch RS. Further, the touch driver 145 may selectively output a signal required for a touch or a signal or voltage that reduces noise in response to the operation of the second level shifter LS2(Uplink).

Referring to FIG. 19, the touch driver 145 may be mounted on a substrate on which the touch sensor 155 is implemented. As described before, the touch sensor 155 may be formed in a series of processes involved in manufacturing the display panel 150. Accordingly, the touch sensor 155 and the touch driver 145 may be implemented together with the touch panel 150 in one module.

Figure 20:
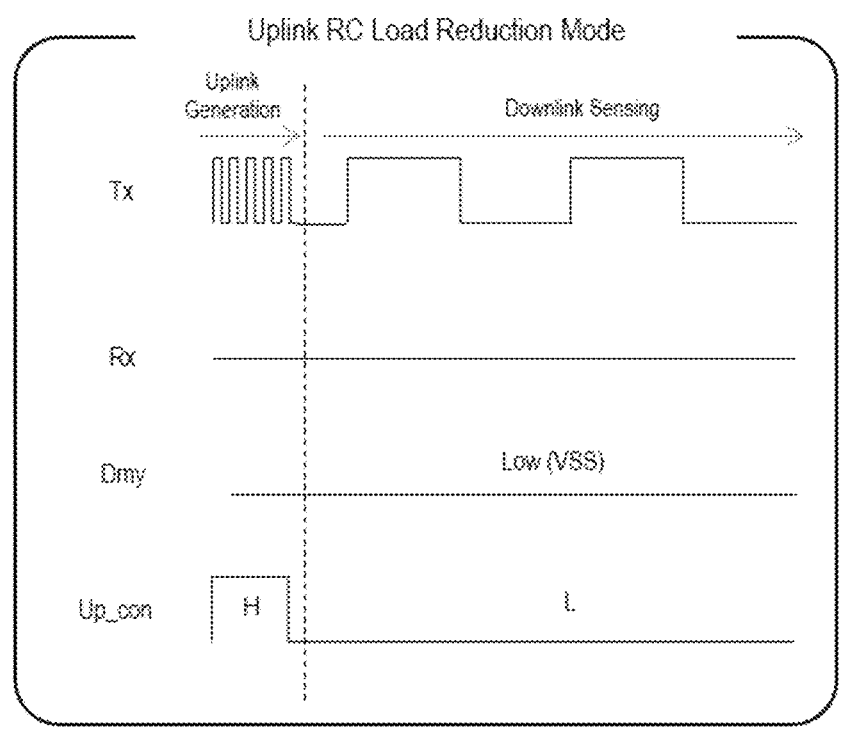
FIGS. 20, 21 and 22 are diagrams illustrating a method of setting each mode in the touch display device according to the first embodiment of the present invention.
Figure 21:
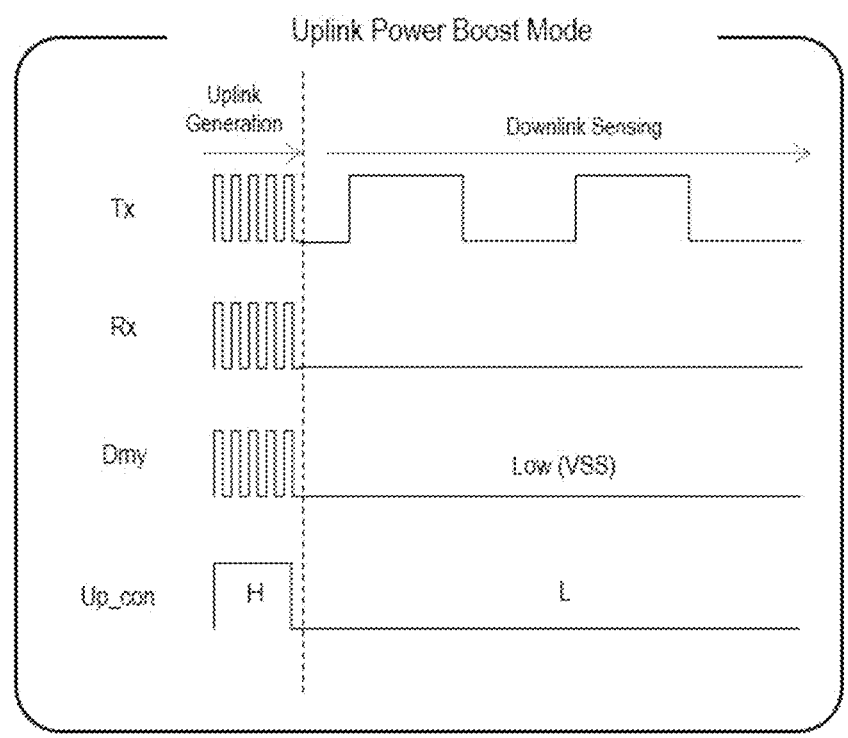
Figure 22:
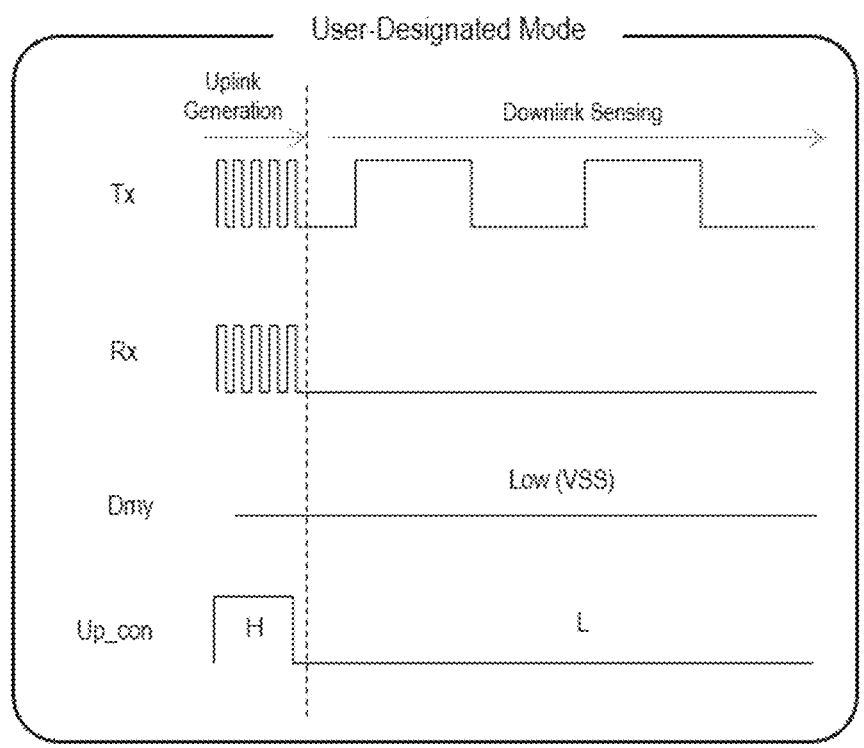

FIGS. 20, 21 and 22 are diagrams illustrating a method of setting each mode of the touch display device according to the first embodiment of the present invention.

Referring to FIGS. 18, 19 and 20, the touch display device according to the first embodiment of the present invention may be set to a mode for reducing RC load in uplink (load reduction mode). The load reduction mode decreases signal driving-incurred load by excluding the output of the second uplink signal Rx during the uplink signal generation period Uplink Generation and reduces noise by outputting the logic low signal Low or the low voltage VSS (or ground voltage) during the downlink pulse sensing period Downlink Sensing.

To achieve the load reduction mode, it may be configured that the first uplink signal Tx is output and the remaining second uplink signal Rx and dummy touch signal Dmy are not output during the uplink signal generation period Uplink Generation. For this purpose, the third control signal Up_Con may be, but not limited to, logic high H. Since signals are operated during the downlink pulse sensing period Downlink Sensing in the manner illustrated FIG. 15, the signal operation will not be described herein.

Referring to FIGS. 18 and 21, the touch display device according to the first embodiment of the present invention may be set to an uplink power boost mode. The uplink power boost mode increases uplink power by using the dummy touch signal Dmy as well as the first and second uplink signals Tx and Rx, for uplink signal application during the uplink signal generation period Uplink Generation, and reduces noise by outputting the logic low signal Low or the low voltage VSS (or ground voltage) during the downlink pulse sensing period Downlink Sensing.

To achieve the uplink power boost mode, it may be configured that the dummy touch signal Dmy is output together with the first and second uplink signals Tx and Rx during the uplink signal generation period Uplink Generation. For this purpose, the third control signal Up_Con may be, but not limited to, logic high H. Since signals are operated during the downlink pulse sensing period Downlink Sensing in the manner illustrated FIG. 15, the signal operation will not be described herein.

Referring to FIGS. 18 and 22, the touch display device according to the first embodiment of the present invention may be set to a user-designated mode. The user-specified mode may be regarded as an intermediate mode between the load reduction mode and the uplink power boost mode. The user-designated mode sets the uplink power to an appropriate level using only the first and second uplink signals Tx and Rx during the uplink signal generation period Uplink Generation, and reduces noise by outputting the logic low signal Low or the low voltage VSS (or ground voltage) during the downlink pulse sensing period Downlink Sensing.

To achieve the user-designated mode, it may be configured that the first and second uplink signals Tx and Rx are output without outputting the remaining dummy touch signal Dmy during the uplink signal generation period Uplink Generation. For this purpose, the third control signal Up_Con may be, but not limited to, logic high H. Since signals are operated during the downlink pulse sensing period Downlink Sensing in the manner illustrated FIG. 15, the signal operation will not be described herein.

Figure 23:
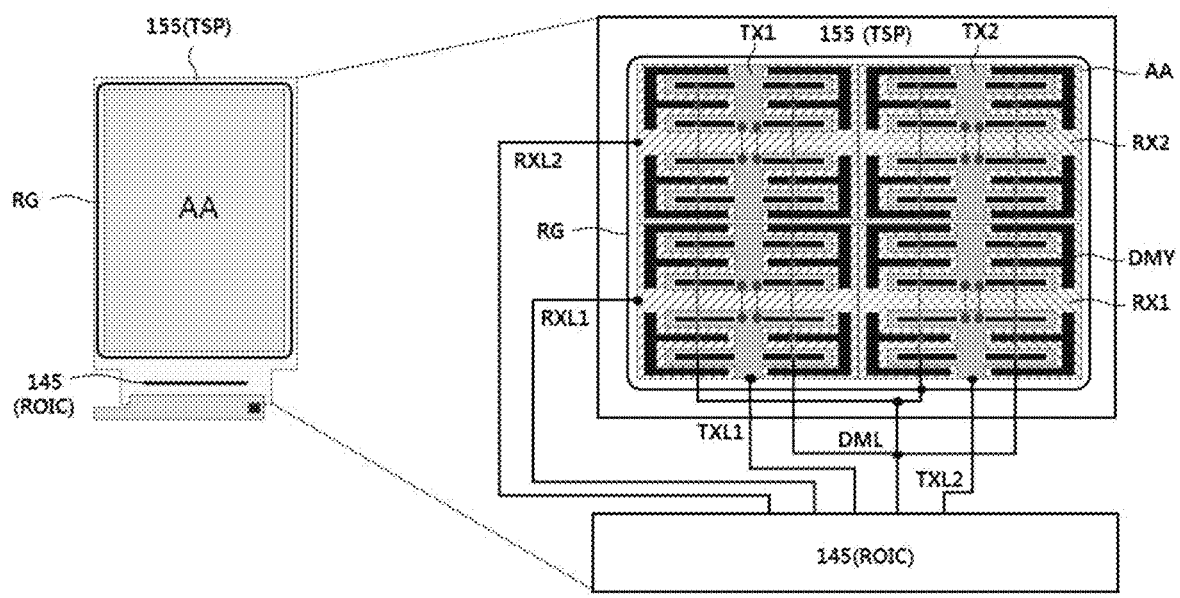
FIG. 23 is an exemplary diagram illustrating a module configuration according to a second embodiment of the present invention.
Figure 24:
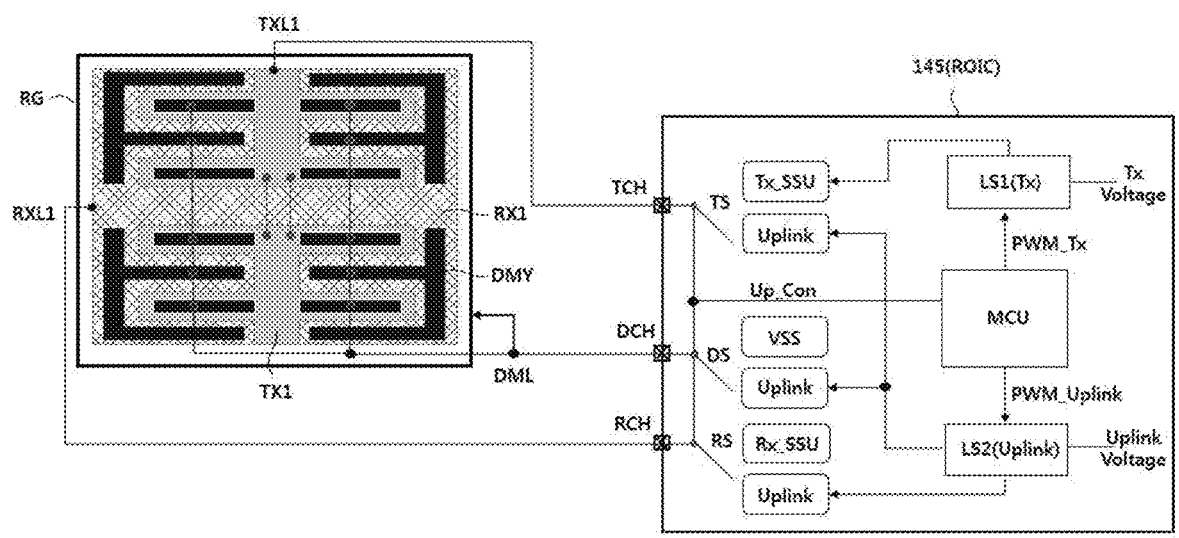
FIG. 24 is an exemplary internal circuit diagram illustrating a touch driver according to the second embodiment of the present invention.

FIG. 23 is an exemplary diagram illustrating a module configuration according to a second embodiment of the present invention, and FIG. 24 is an exemplary internal circuit diagram illustrating a touch driver according to the second embodiment of the present invention.

Referring to FIG. 23, the touch sensor 155 and the touch driver 145 may be implemented together with the touch panel 150 in one module. Unlike the first embodiment, a touch display device module according to the second embodiment may further include a ring guard RG surrounding the active area AA. The ring guard RG may be connected to the dummy value line DML like the dummy touch electrodes DMY.

The ring guard RG is disposed to surround the active area AA. For this reason, when a signal or voltage to be applied to the dummy electrodes DMY is transmitted to the ring guard RG, a radiation area may be increased enough to further increase uplink power or further reduce noise.

Referring to FIG. 24, the touch driver 145 may include the controller MCU, the first level shifter LS1(Tx), the second level shifter LS2(Uplink), the first switch TS, the first circuit Tx_SSU, the uplink unit Uplink, the second switch RS, the second circuit Rx_SSU, a third switch DS, and a third circuit VSS. For the remaining components except for the third switch DS and the third circuit VSS, refer to the description of FIG. 18.

The third switch DS may operate in response to the third control signal Up_Con, like the first switch TS and the second switch RS. A signal or voltage output through the third channel DCH may be different according to the operation of the third switch DS. The third switch DS may connect the third channel DCH to the third circuit VSS or the uplink unit Uplink.

The touch driver 145 may include the first channel TCH connected to the first touch line TXL1, the second channel RCH connected to the second touch line RXL1, and the third channel DCH connected to the dummy touch line DML. The touch driver 145 may selectively output a signal required for a touch in response to the operations of the first switch TS and the second switch RS. Further, the touch driver 145 may selectively output a signal required for a touch or a signal or voltage that reduces noise in response to the operation of the third switch DS.

While the dummy touch electrodes DMY are connected to the third channel DCH of the touch driver 145 through the dummy touch line DML, the dummy touch electrodes DMY may be placed in an electrically floating state, when needed (e.g., when the third switch DS does not contact VSS or Uplink).

Figure 25:
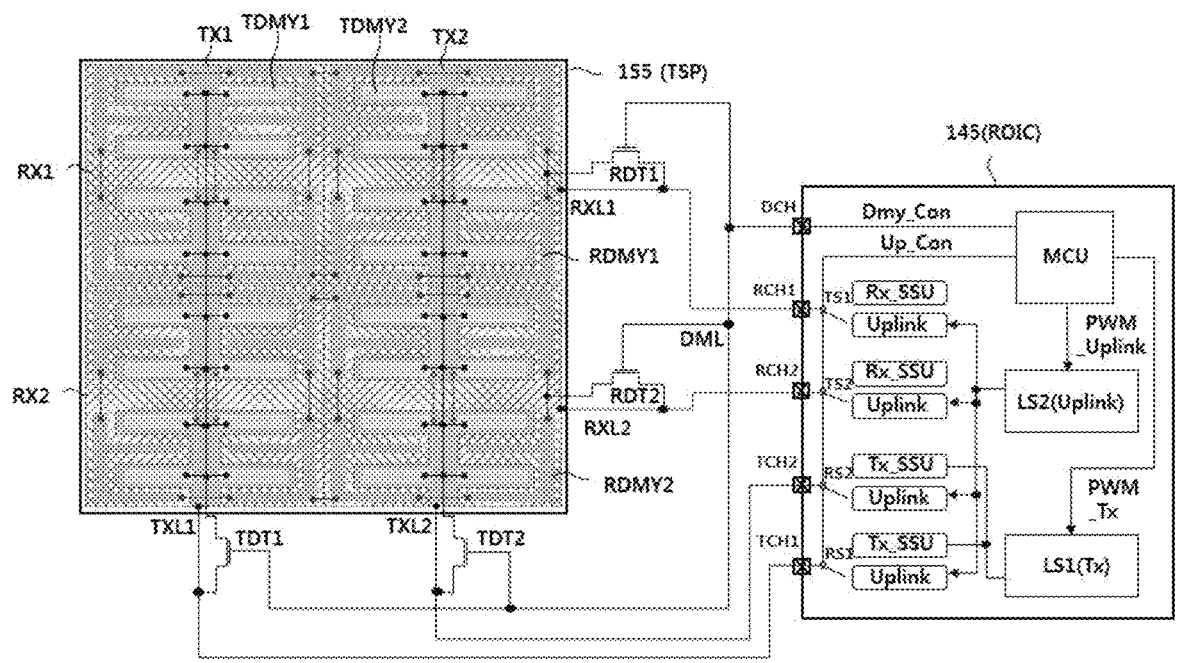
FIG. 25 is a diagram illustrating a touch display device according to a third embodiment of the present invention.
Figure 26:
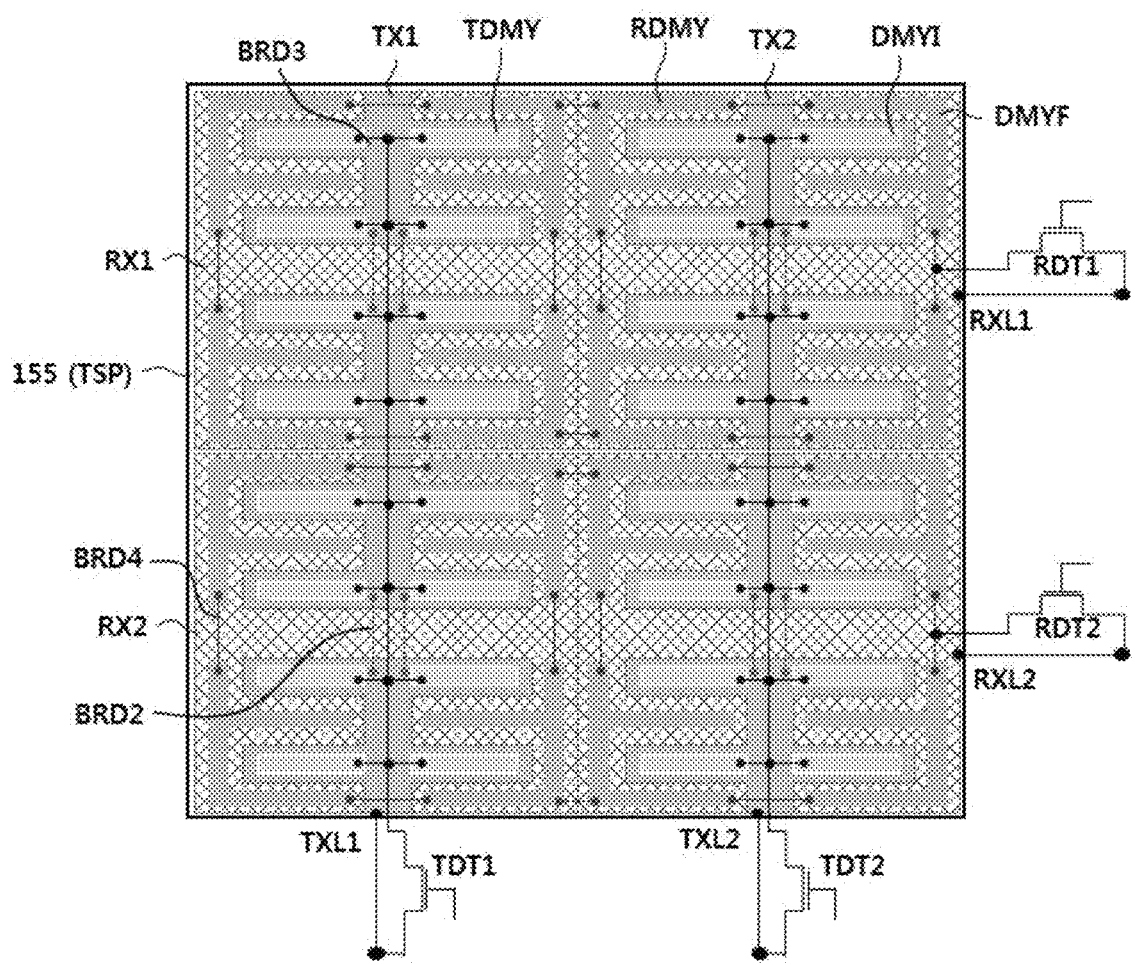
FIG. 26 is a detailed diagram illustrating a touch sensor illustrated in FIG. 25.

FIG. 25 is a diagram illustrating a touch display device according to a third embodiment of the present invention, and FIG. 26 is a detailed diagram illustrating a touch sensor illustrated in FIG. 25. The following description of the third embodiment focuses on differences from the first embodiment or the second embodiment.

Referring to FIGS. 25 and 26, the touch sensor 155 may include the first touch electrodes TX1 and TX2, the second touch electrodes RX1 and RX2, first dummy touch electrodes TDMY1 and TDMY2, second dummy touch electrodes RDMY1 and RDMY2, first dummy transistors TDT1 and TDT2, and second dummy transistors RDT1 and RDT2. The first dummy transistors TDT1 and TDT2 and the second dummy transistors RDT1 and RDT2 may be formed in the form of a thin film inside the touch sensor 155 or may be formed in the form of an IC outside the touch sensor 155.

The first touch electrodes TX1 and TX2 may be connected to the touch driver 145 through the first touch lines TXL1 and TXL2. The second touch electrodes RX1 and RX2 may be connected to the touch driver 145 through the second touch lines RXL1 and RXL2. The first dummy touch electrodes TDMY1 and TDMY2 may be connected to the first touch lines TXL1 and TXL2 through the first dummy transistors TDT1 and TDT2. The second dummy touch electrodes RDMY1 and RDMY2 may be connected to the second touch lines RXL1 and RXL2 through the second dummy transistors RDT1 and RDT2.

The first dummy transistors TDT1 and TDT2 may have first electrodes connected to the first dummy touch electrodes TDMY1 and TDMY2, respectively second electrodes connected to the first touch lines TXL1 and TXL2, respectively, and gate electrodes commonly connected to the dummy touch line DML. The second dummy transistors RDT1 and RDT2 may have first electrodes connected to the second dummy touch electrodes RDMY1 and RDMY2, respectively, second electrodes connected to the second touch lines RXL1 and RXL2, respectively, and gate electrodes commonly connected to the dummy touch line DML.

When the first touch electrodes TX1 and TX2, the second touch electrodes RX1 and RX2, the first dummy touch electrodes TDMY1 and TDMY2, the second dummy touch electrodes RDMY1 and RDMY2, the first dummy transistors TDT1 and TDT2, and the second dummy transistors RDT1 and RDT2 are connected in the above-described manner, the following operations may be performed.

When a logic high signal is applied through the dummy touch line DML, all of the first dummy transistors TDT1 and TDT2 and the second dummy transistors RDT1 and RDT2 may be turned on. When the first dummy transistors TDT1 and TDT2 are turned on, the first touch electrodes TX1 and TX2 may be electrically connected to the first dummy touch electrodes TDMY1 and TDMY2, respectively. For example, the first touch electrode TX1 and the first dummy touch electrode TDMY1 may form a TX touch electrode in a first line, and the first touch electrode TX2 and the first dummy touch electrode TDMY2 may form a TX touch electrode in a second line. When the second dummy transistors RDT1 and RDT2 are turned on, the second touch electrodes RX1 and RX2 may be electrically connected to the second dummy touch electrodes RDMY1 and RDMY2, respectively. For example, the second touch electrode RX1 and the second dummy touch electrode RDMY1 may form an RX touch electrode in the first line, and the second touch electrode RX2 and the second dummy touch electrode RDMY2 may form an RX touch electrode in the second line.

Therefore, when the first dummy transistors TDT1 and TDT2 and the second dummy transistors RDT1 and RDT2 are turned on, the first dummy touch electrodes TDMY1 and TDMY2 may execute the same function as the first touch electrodes TX1 and TX2, and the second dummy touch electrodes RDMY1 and RDMY2 may execute the same function as the second touch electrodes RX1 and RX2.

Compared to the first or second embodiment, the F-shaped portions DMYF and the I-shaped portions DMYI of the dummy electrodes may be separated from each other to form the first dummy touch electrodes TDMY1 and TDMY2 and the second dummy touch electrodes RDMY1 and RDMY2, respectively, and execute different functions. Referring to the first dummy touch electrode TDMY1 that forms the TX touch electrode of the first line together with the first touch electrode TX1, the I-shaped portions DMYI may be electrically connected to each other by a third connection electrode BRD3. Referring to the second dummy touch electrode RDMY that forms the RX touch electrode of the first line together with the second touch electrode RX1, the F-shaped portions DMYF may be electrically connected to each other by a fourth connection electrode BRD4. As described above, the third connection electrode BRD3 and the fourth connection electrode BRD4 are positioned under the first dummy electrodes TDMY1 and TDMY2 and the second dummy electrodes RDMY1 and RDMY2, and are isolated by an insulating layer. As noted from the above description, a dummy touch electrode commonly connected within one sensor unit is separated to execute different functions in the third embodiment.

The touch driver 145 may include the controller MCU, the first level shifter LS1(Tx), the second level shifter LS2 (Uplink), first switches TS1 and TS2, first circuits Tx_SSU, uplink units Uplink, second switches RS1 and RS2, and second circuits Rx_SSU.

As the dummy electrodes of the third embodiment have the above structure, the touch driver 145 may be modified to output a dummy control signal Dmy_Con instead of the uplink signal through the third channel DCH or instead of the logic low signal or low voltage (or ground voltage). In addition, the first dummy transistors TDT1 and TDT2 and the second dummy transistors RDT1 and RDT2 may be simultaneously turned on or turned off in response to the dummy control signal Dmy_Con output through the third channel DCH of the touch driver 145.

However, this is merely an example, and the first dummy transistors TDT1 and TDT2 and the second dummy transistors RDT1 and RDT2 may be connected to different channels of the touch driver 145 to be turned on or turned off during different periods.

FIGS. 27 to 30 are diagrams illustrating a method of setting each mode of the touch display device according to the third embodiment of the present invention.

Figure 27:
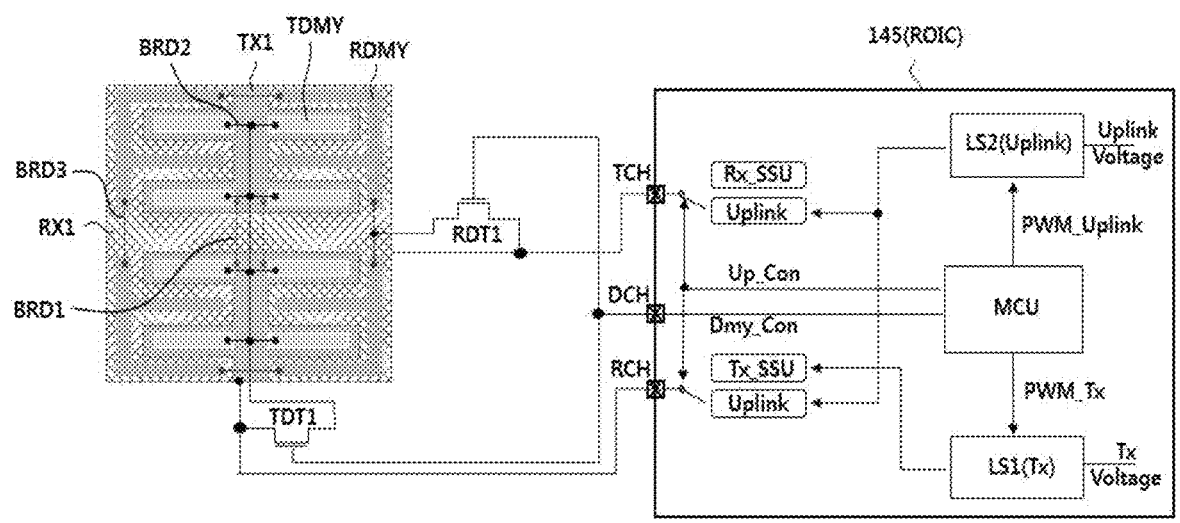
FIGS. 27 to 30 are diagrams illustrating a method of setting each mode in the touch display device according to the third embodiment of the present invention.
Figure 28:
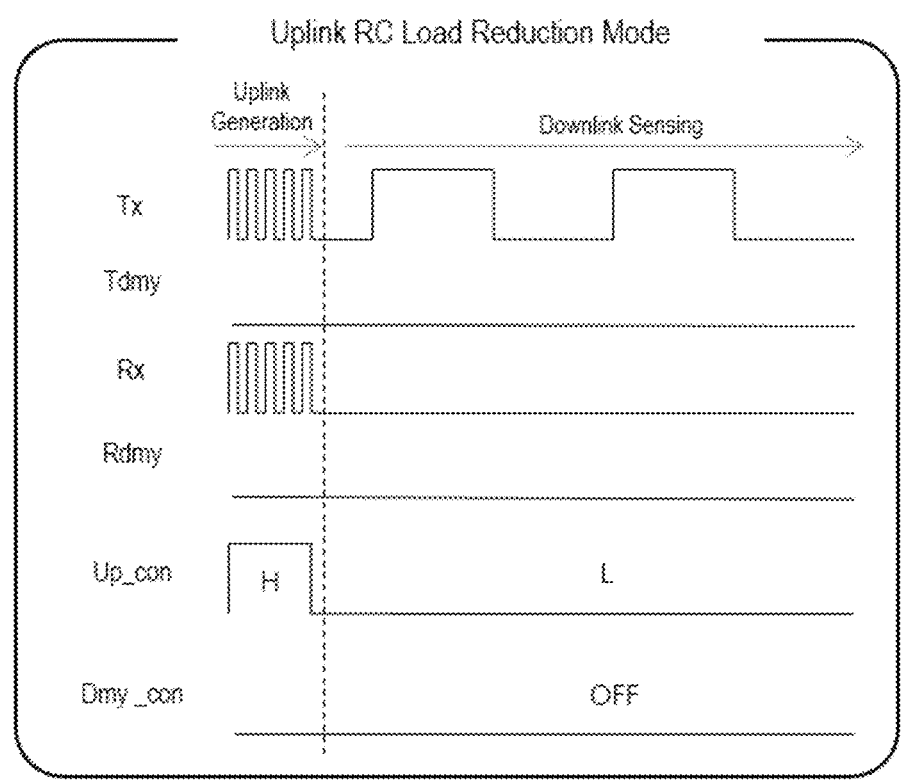

Referring to FIGS. 27 and 28, the touch display device according to the third embodiment of the present invention may be set to a mode for reducing RC load in uplink (load reduction mode). In the load reduction mode, while the first and second uplink signals Tx and Rx are output, the first dummy touch electrodes TDMY1 and TDMY2 and the second dummy touch electrodes RDMY1 and RDMY2 are in an unused state, to decrease load during the uplink generation period Uplink Generation.

To achieve the load reduction mode, the dummy control signal Dmy_Con may be output to turn off the first dummy transistors TDT1 and TDT2 and the second dummy transistors RDT1 and RDT2 during the uplink generation period Uplink Generation.

Figure 29:
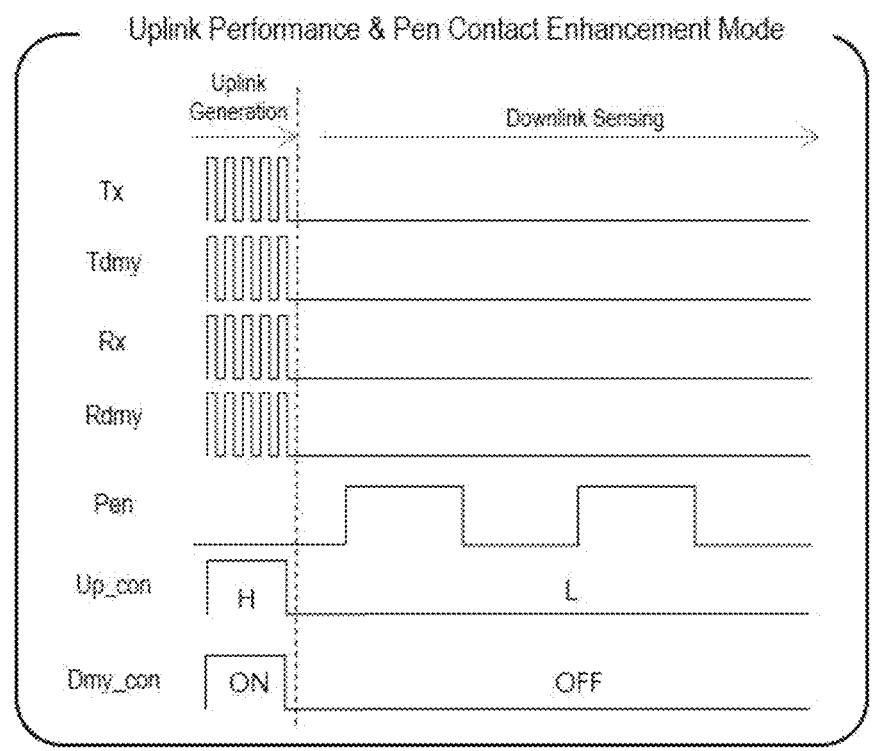

Referring to FIGS. 27 and 29, the touch display device according to the third embodiment of the present invention may be set to an uplink performance and pen contact enhancement mode. In the uplink performance and pen contact enhancement mode, the first and second uplink signals Tx and Rx are output through the first touch electrodes TX1 and TX2, the second touch electrodes RX1 and RX2, the first dummy electrodes TDMY1 and TDMY2, and the second dummy electrodes RDMY1 and RDMY2 during the uplink signal generation period Uplink Generation.

To achieve the uplink performance and pen contact enhancement mode, the dummy control signal Dmy_Con may be output to turn on the first dummy transistors TDT1 and TDT2 and the second dummy transistors RDT1 and RDT2 during the uplink generation period Uplink Generation. When the first dummy touch electrodes TDMY1 and TDMY2 and the second dummy touch electrodes RDMY1 and RDMY2 are used in the same manner as the first touch electrodes TX1 and TX2 and the second touch electrodes RX1 and RX2 in uplink, a signal Pen from contact of the active pen may be easily sensed during the downlink pulse sensing period Downlink Sensing.

When the first touch electrodes TX1 and TX2 and the second touch electrodes RX1 and RX2 are electrically disconnected from the first dummy touch electrodes TDMY1 and TDMY2 and the second dummy touch electrodes RDMY1 and RDMY2 during the downlink pulse sensing period Downlink Sensing, noise introduced through a parasitic capacitor as well as driving load may be reduced, thereby further increasing the pen contact accuracy of the active pen.

Figure 30:
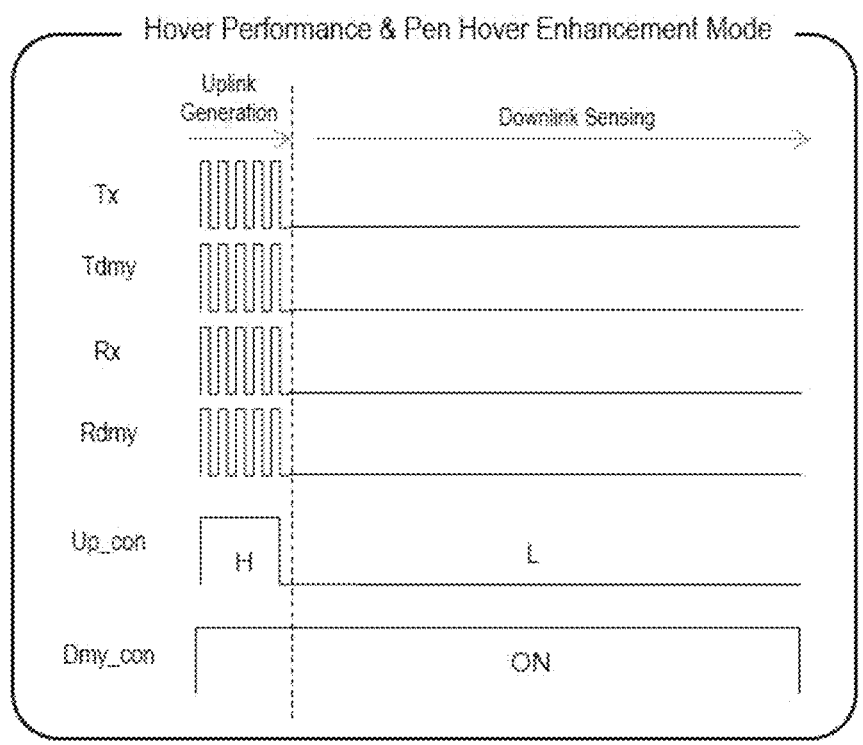

Referring to FIGS. 27 and 30, the touch display device according to the third embodiment of the present invention may be set to a hover performance and pen hover enhancement mode. The hover performance and pen hover enhancement mode is similar to the uplink performance and pen contact enhancement mode, except that even during the downlink pulse sensing period Downlink Sensing, the first dummy touch electrodes TDMY1 and TDMY2 and the second dummy touch electrodes RDMY1 and RDMY2 are used in the same manner as the first touch electrodes TX1 and TX2 and the second touch electrodes RX1 and RX2.

To achieve hover performance and pen hover enhancement mode, the dummy control signal Dmy_Con may be output to turn on the first dummy electrodes TDMY1 and TDMY2 and the second dummy electrodes RDMY1 and RDMY2 during the uplink signal generation period Uplink Generation and the downlink pulse sensing period Downlink Sensing. In other words, the first dummy electrodes TDMY1 and TDMY2 and the second dummy electrodes RDMY1 and RDMY2 may be maintained in the turned-on state during the uplink signal generation period Uplink Generation and the downlink pulse sensing period Downlink Sensing. When the first dummy touch electrodes TDMY1 and TDMY2 and the second dummy touch electrodes RDMY1 and RDMY2 are used in the same manner as the first touch electrodes TX1 and TX2 and the second touch electrodes RX1 and RX2 in uplink and downlink, it may be easily determined whether the active pen is hovering during the downlink pulse sensing period Downlink Sensing.

As is apparent from the foregoing description of the present invention, as dummy touch electrodes are formed around touch electrodes and a specific signal or voltage is applied through the dummy touch electrodes, the signal transmission/reception sensitivity between an active pen and a device may be increased and noise is reduced. Further, the problem of signal transmission and reception deterioration caused by space occupation of the dummy electrodes may be solved by using the dummy touch electrodes for a different purpose in each driving mode. Further, the recognition capability (without interruptions) or driving capability (movement such as drawing) of the active pen may be increased based on the improved capability of signal transmission/reception to/from the active pen.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A touch display device comprising:
a display panel configured to display an image;
a touch sensor including a first touch electrode and a second touch electrode arranged to cross each other, and a dummy touch electrode disposed adjacent to the first touch electrode and the second touch electrode, on the display panel; and
a touch driver configured to drive the first touch electrode and the second touch electrode and apply a signal or a voltage to the dummy touch electrode,
wherein during an uplink signal generation period of a first mode of the touch display device, the touch driver is configured to apply a same uplink signal to the dummy touch electrode and at least one of the first touch electrode or the second touch electrode, and the same uplink signal is obtained by an active pen from the dummy touch electrode and the at least one of the first touch electrode or the second touch electrode during the uplink signal generation period,
wherein during a downlink pulse sensing period during which a pen signal generated by the active pen is sensed, the touch driver is configured to apply a logic low signal or a low voltage to the dummy touch electrode, the downlink pulse sensing period after the uplink signal generation period.

2. The touch display device according to claim 1, wherein during a second mode of the touch display device, the touch driver applies the logic low signal or the low voltage to the dummy touch electrode during the uplink signal generation period of the second mode during which a signal to be transmitted to an active pen placed on the touch sensor is generated and during the downlink pulse sensing period of the second mode during which the pen signal generated from the active pen placed on the touch sensor is sensed.

3. The touch display device according to claim 1, wherein the touch sensor further comprises a ring guard disposed to surround an active area in which the first touch electrode, the second touch electrode, and the dummy touch electrode are located, and
wherein the touch driver applies the signal or the voltage to the ring guard.

4. The touch display device according to claim 1, wherein the dummy touch electrode comprises:
a first dummy touch electrode configured to execute the same function as the first touch electrode; and
a second dummy touch electrode configured to execute the same function as the second touch electrode.

5. The touch display device according to claim 4, wherein when a first dummy transistor located between the first touch electrode and a first channel of the touch driver is turned on, the first dummy touch electrode executes the same function as the first touch electrode, and
wherein when a second dummy transistor located between the second touch electrode and a second channel of the touch driver is turned on, the second dummy touch electrode executes the same function as the second touch electrode.

6. The touch display device according to claim 5, wherein the first dummy transistor and the second dummy transistor are simultaneously tuned on or tuned off in response to a dummy control signal output from a third channel of the touch driver.

7. The touch display device according to claim 6, wherein the touch driver comprises:
switches configured to control input and output of the first channel, the second channel, and the third channel;
a circuit configured to output or sense the signal, when the circuit is connected to one or more of the first, second, and third channels through one or more of the switches; and
a controller configured to control the switches and the circuit.

8. The touch display device according to claim 1, wherein the dummy touch electrode is located between portions of the first touch electrode and between portions of the second touch electrode, on the same layer as the first touch electrode and the second touch electrode.

9. A method of driving a touch display device including a display panel configured to display an image, a touch sensor including a first touch electrode and a second touch electrode arranged to cross each other, and a dummy touch electrode disposed adjacent to the first touch electrode and the second touch electrode, on the display panel, and a touch driver configured to drive the first touch electrode and the second touch electrode and apply a signal or a voltage to the dummy touch electrode, the method comprising:
during an uplink signal generation period of a first mode of the touch display device, applying a same uplink signal to the dummy touch electrode and at least one of the first touch electrode or the second touch electrode, the same uplink signal obtained by an active pen placed on the touch sensor from the dummy touch electrode and the at least one of the first touch electrode or the second touch electrode during the uplink signal generation period; and during a downlink pulse sensing period that is after the uplink signal generation period, applying a logic low signal or a low voltage to the dummy touch electrode and sensing a downlink pulse generated from the active pen placed on the touch sensory.

10. A touch display device comprising:
a display panel configured to display an image;
a touch sensor on the display panel, the touch sensor including a first touch electrode, a second touch electrode arranged to cross the first touch electrode, and a dummy touch electrode disposed around the first touch electrode and the second touch electrode, and
a touch driver configured to drive the first touch electrode and the second touch electrode and apply a signal or a voltage to the dummy touch electrode,
wherein during an uplink signal generation period of a first mode of the touch display device, the touch driver is configured to apply a same uplink signal to the dummy touch electrode and at least one of the first touch electrode or the second touch electrode, and the same uplink signal is obtained by an active pen from the dummy touch electrode and the at least one of the first touch electrode or the second touch electrode during the uplink signal generation period,
wherein during a downlink pulse sensing period during which a pen signal generated by the active pen is sensed, the touch driver is configured to apply a logic low signal or a low voltage to the dummy touch electrode, the downlink pulse sensing period after the uplink signal generation period,
wherein the dummy touch electrode is electrically connected to the first touch electrode or the second touch electrode in response to a dummy control signal being in a first state, and
wherein the dummy touch electrode is electrically disconnected from the first touch electrode and the second touch electrode in response to the dummy control signal being in a second state.

11. The touch display device according to claim 10, wherein during the uplink signal generation period the dummy touch electrode is electrically connected to the first touch electrode or the second touch electrode in response to the dummy control signal being in the first state.

12. The touch display device according to claim 10, wherein during the uplink signal generation period of a second mode in which a signal to be transmitted to the active pen placed on the touch sensor is generated and during the downlink pulse sensing period of the second mode in which the pen signal generated from the active pen placed on the touch sensor is sensed:
the dummy touch electrode is electrically disconnected from the first touch electrode and the second touch electrode in response to the dummy control signal being in a second state, and the logic low signal or the low voltage is applied to the dummy touch electrode during the second mode.

13. The touch display device according to claim 10, wherein the touch sensor further comprises a ring guard disposed to surround an active area in which the first touch electrode, the second touch electrode, and the dummy touch electrode are located, and
wherein a signal or a voltage is applied to the ring guard.

14. The touch display device according to claim 10, wherein the dummy touch electrode comprises:
a first dummy touch electrode configured to be electrically connected to or disconnected from the first touch electrode in response to the dummy control signal; and
a second dummy touch electrode configured to be electrically connected to or disconnected from the second touch electrode in response to the dummy control signal, and
wherein the first dummy electrode and the second dummy electrode are electrically disconnected from each other.

15. The touch display device according to claim 14, further comprising:
a first dummy transistor electrically connecting the first dummy electrode to, or disconnecting the first dummy electrode from, the first touch electrode in response to the dummy control signal, and
a second dummy transistor electrically connecting the second dummy electrode to, or disconnecting the second dummy electrode from, the second touch electrode in response to the dummy control signal.

16. The touch display device according to claim 15, wherein the first dummy transistor and the second dummy transistor are simultaneously turned on or off in response to the dummy control signal.

* * * * *